United States Patent
Landry

(10) Patent No.: US 11,541,987 B2
(45) Date of Patent: Jan. 3, 2023

(54) AIRCRAFT WITH FOLDABLE TAIL

(71) Applicant: Bell Textron Inc., Fort Worth, TX (US)

(72) Inventor: Martin Landry, Prevost (CA)

(73) Assignee: TEXTRON INNOVATIONS INC., Providence, RI (US)

(*) Notice: Subject to any disclaimer, the term of this patent is extended or adjusted under 35 U.S.C. 154(b) by 155 days.

(21) Appl. No.: 16/544,117

(22) Filed: Aug. 19, 2019

(65) Prior Publication Data

US 2021/0053670 A1 Feb. 25, 2021

(51) Int. Cl.
  *B64C 5/12* (2006.01)
  *B64C 5/06* (2006.01)
  *B64C 29/02* (2006.01)
  *B64C 39/04* (2006.01)
  *B64C 13/24* (2006.01)

(52) U.S. Cl.
  CPC .............. *B64C 5/12* (2013.01); *B64C 5/06* (2013.01); *B64C 13/24* (2013.01); *B64C 29/02* (2013.01); *B64C 39/04* (2013.01)

(58) Field of Classification Search
  CPC .. B64C 5/06; B64C 5/12; B64C 29/02; B64C 39/04; B64C 9/06; B64C 9/34; B64C 27/22; B64C 1/26; B64C 1/30
  See application file for complete search history.

(56) References Cited

U.S. PATENT DOCUMENTS

| | | | | |
|---|---|---|---|---|
| 3,582,021 A | * | 6/1971 | Pender | B64C 29/02 244/7 A |
| 3,881,671 A | * | 5/1975 | Bouchnik | B64D 25/12 244/140 |
| 4,706,907 A | * | 11/1987 | Kopylov | B64C 31/024 244/119 |
| 6,978,970 B2 | | 12/2005 | Purcell, Jr. | |
| 9,545,991 B1 | * | 1/2017 | Alley | B64C 3/40 |
| 10,442,522 B2 | * | 10/2019 | Oldroyd | B64C 29/02 |
| 2002/0066825 A1 | * | 6/2002 | Miralles | B64G 1/222 244/49 |
| 2003/0089820 A1 | | 5/2003 | Martorana et al. | |
| 2003/0094536 A1 | * | 5/2003 | LaBiche | B64C 5/12 244/2 |
| 2005/0274845 A1 | | 12/2005 | Miller et al. | |
| 2008/0093501 A1 | | 4/2008 | Miller et al. | |
| 2016/0311545 A1 | * | 10/2016 | Parks | B64D 27/24 |
| 2017/0190412 A1 | * | 7/2017 | Bunting | B64C 29/02 |
| 2018/0079486 A1 | * | 3/2018 | Kooiman | B64C 27/50 |
| 2020/0094941 A1 | * | 3/2020 | Barmichev | B64C 7/00 |

OTHER PUBLICATIONS

Whittle, Richard, "Bell V-280 tiltrotor design reflects V-22 lessons, Army requirements," JMR Tech Demo Update vol. 62, No. 1, Vertiflite Jan./Feb. 2016, 4 pages; https://vtol.org/files/dmfile/JMR_Bell-Vertiflite.pdf.

* cited by examiner

Primary Examiner — Joshua J Michener
Assistant Examiner — Colin Zohoori
(74) Attorney, Agent, or Firm — Akona IP PC

(57) ABSTRACT

An embodiment is an aircraft, including at least a fuselage, a tail rotatably coupled to the fuselage, the tail coupled at an aft of the fuselage, and a tail actuator coupled to the fuselage and the tail, the tail actuator to transition the tail between an extended position and a retracted position.

15 Claims, 12 Drawing Sheets

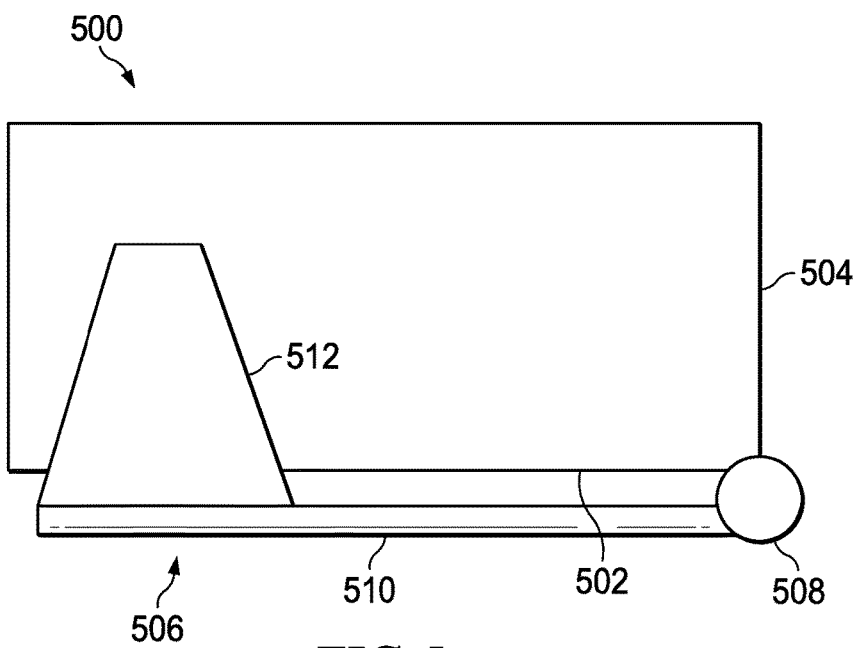
FIG.5
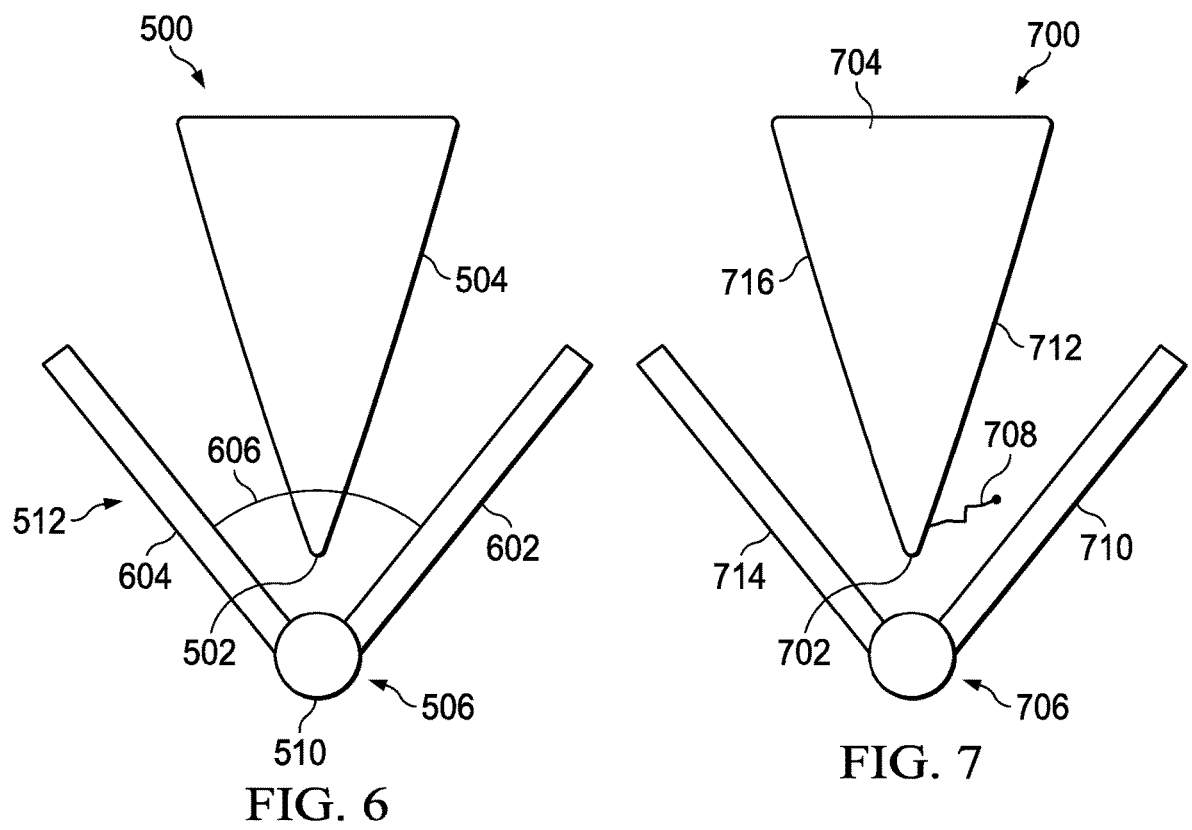
FIG. 6
FIG. 7

AIRCRAFT WITH FOLDABLE TAIL

TECHNICAL FIELD

This disclosure relates generally to aircraft and, more particularly, to a vertical takeoff and landing ("VTOL") aircraft having a foldable tail.

BACKGROUND

Unlike fixed-wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft. Yet another type of VTOL aircraft is commonly referred to as a "tail-sitter." As the name implies, a tail-sitter takes off and lands on its tail, but tilts horizontally for forward flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based controller, and a system of communication between the vehicle and controller.

Aircraft are generally used for high speed direct transport of passengers and/or cargo. Uneven loading of such passengers and/or cargo can affect the center of gravity ("CG") of an aircraft, which may affect flight characteristics and performance of the aircraft. Fixed-wing aircraft offer advantages over rotorcraft in that they are capable of longer range and more efficient flight. In contrast, rotorcraft have the distinct advantage of vertical takeoff and landing, hover, sideward, rearward, and forward flight, which allows for precise landing in space-restricted or otherwise obstructed landing zones in addition to precise maneuvering to and from such landing zones. Tiltrotors and tail-sitters enjoy the advantages of both fixed-wing aircraft and rotorcraft; however, they are especially sensitive to changes in weight and CG.

SUMMARY

An embodiment is an aircraft, including at least a fuselage, a tail rotatably coupled to the fuselage, the tail coupled at an aft of the fuselage, and a tail actuator coupled to the fuselage and the tail, the tail actuator to transition the tail between an extended position and a retracted position.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIG. 5 is a side view of a portion of an aircraft in accordance with embodiments described herein.

FIG. 6 is a cross-sectional, end view of the portion of the aircraft of FIG. 5 in accordance with embodiments described herein.

FIG. 7 is a cross-sectional, end view of a portion of another aircraft in accordance with embodiments described herein.

DETAILED DESCRIPTION

Figure 1:
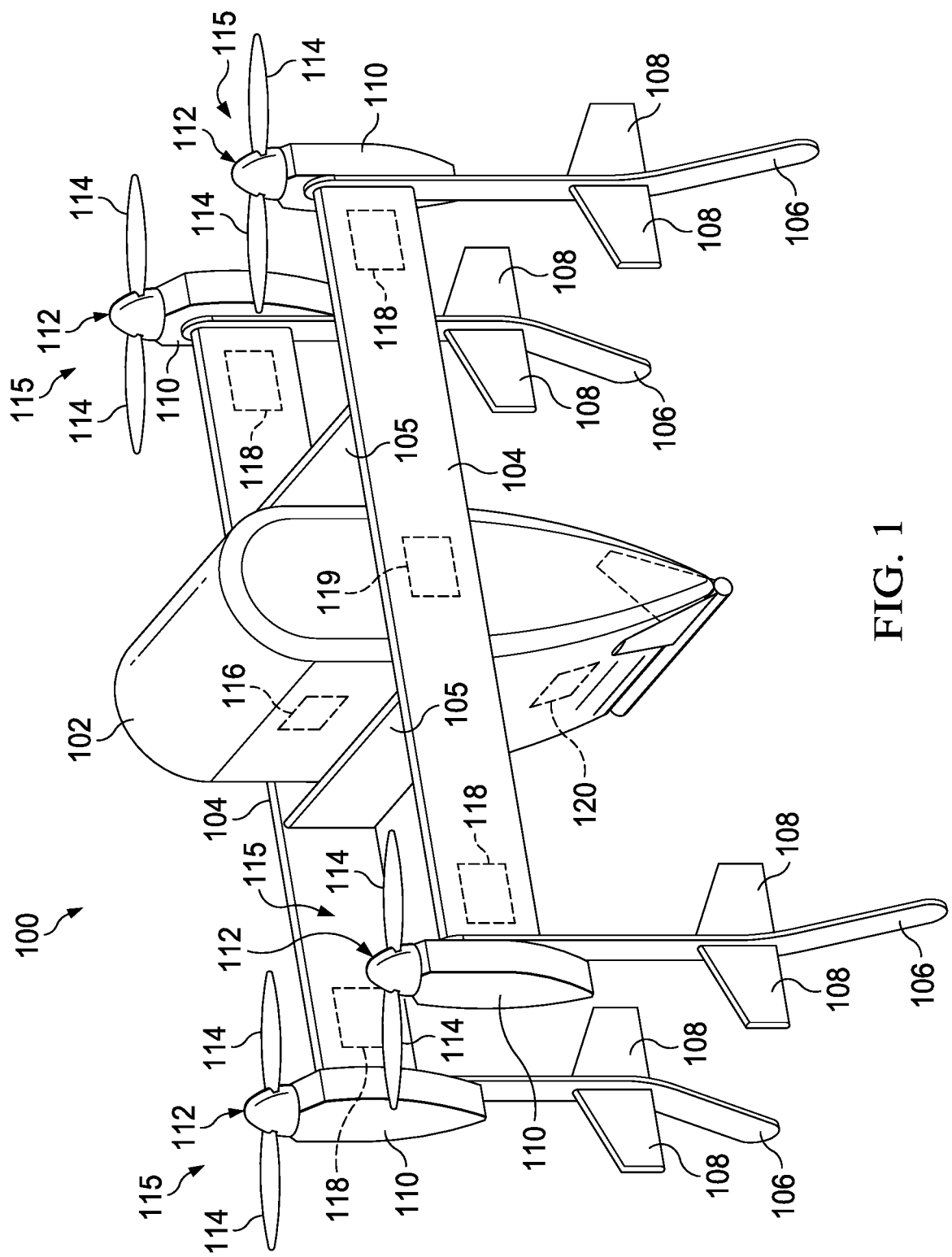
FIG. 1 is an oblique view of an aircraft configured for operation in a helicopter flight mode in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

In the disclosure, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this disclosure, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

As markets emerge for unmanned aerial vehicles (or "UAVs") to deliver packages with minimal-to-no human interaction, it becomes important for the aircraft to be able to adjust its flight control gains for a wide range of weights and center of gravity ("CG") locations. This is particularly challenging for VTOL UAVs when the payload's weight and CG location is unique for every package the UAV picks up. The fact that such aircraft are required to perform precision landings makes it important that their control systems are performing at their peak. In accordance with the teachings of certain embodiments described herein, in response to a triggering event, such as closure of the cargo pod, the aircraft is caused to enter a low hover state and execute a short series of maneuvers. Such maneuvers may include a roll maneuver (i.e., a rotation about a longitudinal (front to rear) axis of the aircraft, defined herein as the X axis), a pitch maneuver (i.e., a rotation about a lateral (right to left) axis of the aircraft, defined herein as the Y axis) and/or a yaw maneuver (i.e., a rotation about a vertical (top to bottom) axis of the aircraft, defined herein as the Z axis). The response of the aircraft to the series of maneuvers is detected by a number of sensors and is used to evaluate the aircraft's overall gross weight, CG location, and payload inertia. The aircraft's Flight Control System ("FCS") uses the determined weight, CG location and/or payload inertia data to index one or more lookup tables (or as input into one a numerical model) populated with optimal control data developed during characterization flights for a variety of weight, CG, and/or payload inertia combinations. In particular, the optimal control data includes optimal control gains to be applied during operation of the aircraft under a particular combination of weight, CG, and/or payload inertia conditions. In particular, the one or more "most like" response(s) from the lookup table(s)/numerical model are used to assign the associated control gains. In effect, the aircraft performs the maneuvers to "feel" its own weight and CG, as well as the inertia of the payload, after which the aircraft's FCS applies the control gains output from the table(s)/numerical model in operating the aircraft. For example, throttle gain may be adjusted to account for the overall weight of the vehicle including payload. The greater the overall weight, the more the vehicle will benefit from a higher throttle gain in order to get the same reaction from the vehicle without payload; however, increasing the throttle gain too much will cause the vehicle to oscillate.

In certain embodiments, the FCS may alternatively and/or additionally leverage sensors deployed at a kiosk or launch point, which sensors may provide differential GPS information for enabling precise determination of the location and altitude of the aircraft, as well as access to information regarding wind conditions, air temp and pressure to further improve the ability of the FCS of the aircraft to estimate the aircraft's weight and CG and the effect thereof on the control gains under present conditions.

In still other embodiments, the series of maneuvers may also be used by the FCS to determine whether the payload being picked up contains an unsecured object (which may be indicated by the detected inertia of the payload), which may make the aircraft unstable during flight. In such cases, the aircraft may take remedial measures to avoid flight problems, such as aborting takeoff and/or returning the payload to a kiosk until the situation can be corrected. Such embodiments may thereby improve the accuracy and performance of an aircraft after it picks up a payload by verifying that the payload is properly secured and has a stable CG.

In still other embodiments, an enterprise system may provide the aircraft with payload weight, CG, and/or inertia and the maneuvers may be performed in order to verify the accuracy of the information provided, and thereby verify the identity of the payload. Should the provided payload weight, CG, and/or inertia information not correspond to the detected payload weight, CG and/or inertia information, the aircraft may take remedial measures, such as aborting takeoff and/or alerting the enterprise system of the discrepancy. In an alternative embodiment, the aircraft may omit performing the maneuvers (in an effort to increase the overall speed of payload delivery) and may combine the payload information provided by the enterprise system with known information regarding the weight, CG, and/or inertia of the aircraft, and use the combined information as input to the lookup table(s)/numerical model to determine optimal flight controls/control gains for the loaded aircraft.

In yet other embodiments, payload physical characteristics, such as weight, CG, and inertia, may be provided by a remote pilot system or may be received into the FCS through a payload sensor reading or detecting a shipping label, QR code, RFID tag, or other identifying feature associated with the payload that associates such physical characteristics with the payload.

Disclosed herein, in at least some embodiments, is a vertical takeoff and landing (VTOL) aircraft that includes a fuselage having a foldable tail coupled to the fuselage. The tail may be coupled to the fuselage via a rotation element that allows the tail to be rotated by the rotation element. The tail may be rotated between an extended position, where the tail extends away from the fuselage and can provide stability for the aircraft, and a retracted position, where the tail extends along the fuselage and can avoid interference when the aircraft is taking off and landing in a vertical lift orientation.

During operation and flight of the aircraft, which can include vertical takeoff and landing, hover, sideward, rearward, and forward flight, the center of gravity of the aircraft can change. The shift in the center of gravity is detected by one or more sensors and may be the result of the payload shifting, addition or removal of one or more payload components, a change in operation of the aircraft, and/or the use of fuel by the aircraft. The aircraft disclosed herein includes a flight control system ("FCS") that adaptively selects optimal control gains of the aircraft based on weight, CG, and/or payload inertia, thereby effectively and adaptively optimizing operation of the aircraft during helicopter, transition, and airplane modes so as to optimize payload transportation speed and safety.

Accordingly, this disclosure contemplates a vertical takeoff and landing (VTOL) aircraft comprising a cargo pod and having an FCS configured to adaptively select and apply aircraft control gains in order to optimize operation of the aircraft during transportation of a payload to its intended destination. Still further, in embodiments of this disclosure, the aircraft may be fully autonomous and self-directed via a predetermined or preprogrammed location-based guidance system (e.g., global positioning system (GPS), coordinate-based location, street address, etc.) to allow for accurate delivery of the payload to its intended destination.

Figure 2:
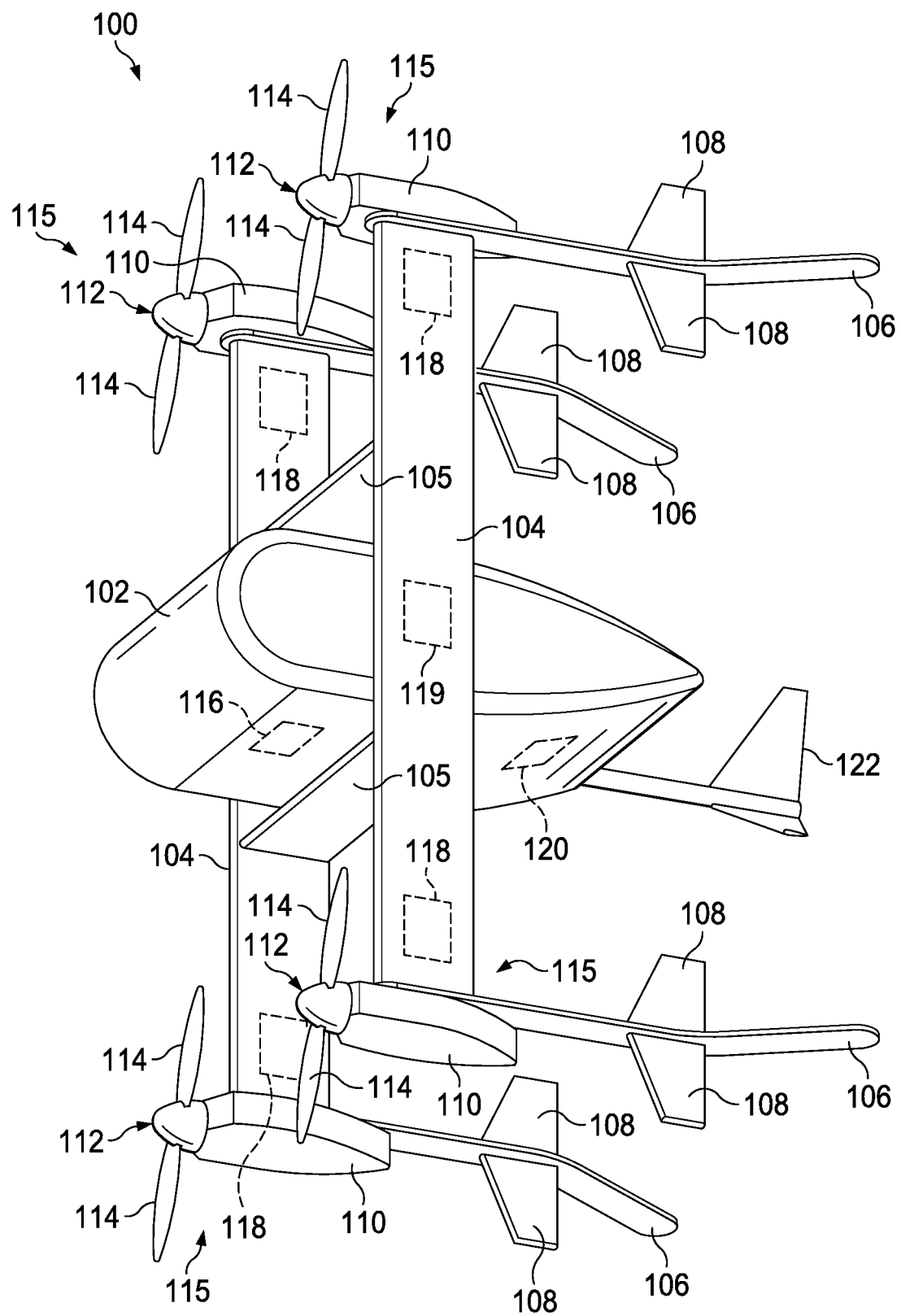
FIG. 2 is an oblique view of the aircraft of FIG. 1 configured for operation in an airplane flight mode in accordance with embodiments described herein.

Referring now to FIGS. 1 and 2, oblique views of an aircraft 100 are shown according to this disclosure. Aircraft 100 is generally configured as a vertical takeoff and landing ("VTOL") aircraft, more specifically an autonomous pod transport ("APT") convertible drone aircraft, that is operable in a helicopter mode (shown in FIG. 1) associated with vertical takeoff from and landing to a landing zone, hover, and sideward and rearward mobility or flight, and an airplane mode (shown in FIG. 2) associated with forward flight. Additionally, since aircraft 100 is a convertible aircraft, it is also operable in a conversion mode when transitioning between the helicopter and airplane modes. Further, being a drone-type aircraft, aircraft 100 is configured for remote control and operation. Additionally, at least in some embodiments, aircraft 100 may be fully made autonomous and self-directed via a predetermined or preprogrammed location-based guidance system (e.g., global positioning system ("GPS"), coordinate-based location, street address, etc.).

Aircraft 100 comprises a cargo pod 102 (which also may be referred to as a fuselage 102) that may function as the aircraft fuselage, wings 104, vertical supports 105 disposed between the wings 104, tail booms 106, horizontal stabilizers 108 extending from each tail boom 106, and a plurality of pylons 110 each comprising a rotor system 112 having a plurality of rotor blades 114. In the illustrated embodiment, the wings 104 comprise biplane wings with the tail booms 106 and the horizontal stabilizers 108 coupled to the biplane wings, but it is to be understood that different wing arrangements may be implemented, and the tail booms 106 and/or the horizontal stabilizers 108 may be omitted in other embodiments. Each combination of a pylon 110 and its associated rotor system 112 comprising rotor blades 114 may be referred to herein as a propulsion assembly 115. Aircraft 100 also comprises a payload sensor 116, a plurality of aircraft sensors 118, an orientation sensor 119, and a control system 120. Wings 104 comprise a substantially parallel, double-wing configuration that provides lift to the aircraft 100 during forward flight while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In some embodiments, the cargo pod 102 may be affixed to the wings 104. However, in other embodiments, the cargo pod 102 may be affixed to the vertical supports 105 or both the wings 104 and the vertical supports 105. While two vertical supports 105 are shown, the aircraft 100 may comprise more vertical supports 105 depending on the configuration of the aircraft 100 in other embodiments.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 provide a wider base for the landing gear. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor. However, in other embodiments, the rotor systems 112 may be driven by a combustion engines or auxiliary power unit through a plurality of interconnect driveshafts and/or auxiliary gearboxes. Furthermore, since aircraft 100 functions as a convertible aircraft, the rotational speeds of each rotor system 112 may be selectively controlled to orient aircraft 100 in the various flight modes.

The aircraft 100 further includes a tail 122. The tail 122 is coupled at an aft of the cargo pod 102 and extends away from the back of the cargo pod 102. In some embodiments, the tail 122 may comprise a v-tail as illustrated. The tail 122 may provide flight stability when the aircraft 100 is in forward flight. The tail 122 may be rotationally coupled to the cargo pod 102 in some embodiments, where the tail 122 can rotate about the coupling point between the tail 122 and the cargo pod 102. The tail 122 can be rotated toward (such as perpendicular to) the cargo pod 102 when the aircraft is in hover operation to avoid instability of flight that can be caused by cross winds and avoid interference when the aircraft 100 is landed.

Figure 3:
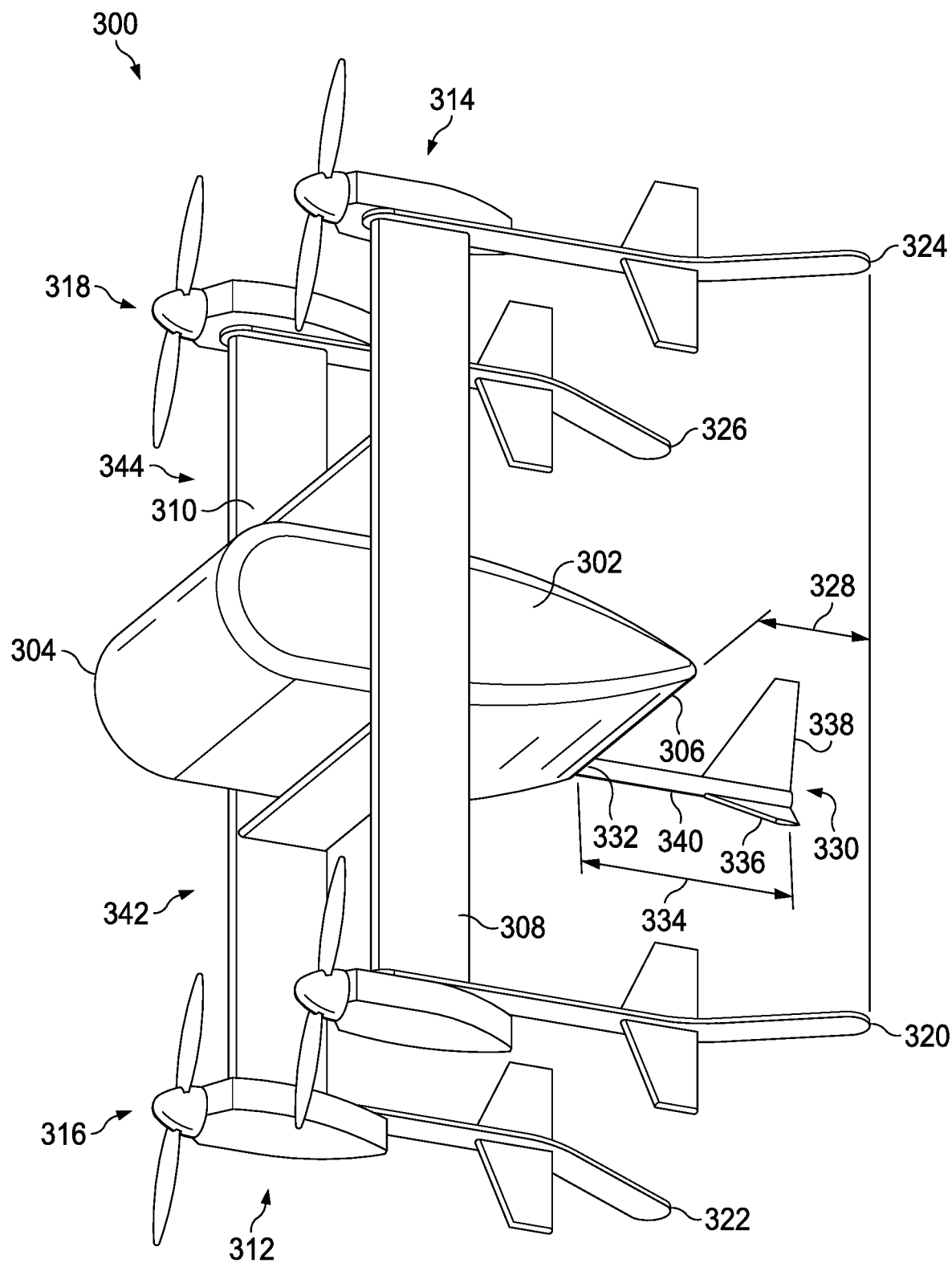
FIG. 3 is an oblique view of another aircraft in accordance with embodiments described herein.

FIG. 3 is an oblique view of another aircraft 300 in accordance with embodiments described herein. The aircraft 300 may include one or more of the features of the aircraft 100 (FIG. 1). In some embodiments, the aircraft 300 may comprise a VTOL. Further, the aircraft 300 may comprise a UAV in some embodiments. The aircraft 300 is illustrated in a forward thrust orientation in FIG. 3.

The aircraft 300 includes a fuselage 302. The fuselage 302 may include one or more of the features of the fuselage 102 (FIG. 1). The fuselage 302 may comprise a pod in some embodiments. The fuselage 302 may include an area to store packages within the fuselage 302, electronic components of the aircraft 300, mechanical components of the aircraft 300, fuel for the aircraft 300, or some combination thereof. The fuselage 302 has a front edge 304 located at a front of the aircraft and a trailing edge 306 located at a back of the aircraft 300.

The aircraft 300 further includes wings coupled to the fuselage 302. In particular, the aircraft includes first wing 308 coupled on a top of the fuselage 302 and second wing 310 coupled on a bottom of the fuselage 302. A first portion 342 of the first wing 308 and the second wing 310 extend from the fuselage 302 on a first side and a second portion 344 of the first wing 308 and the second wing 310 extend from the fuselage 302 on a second side, the second side of the fuselage 302 being opposite to the first side of the fuselage 302.

The aircraft 300 further includes one or more pylons. For example, the aircraft 300 includes a first set of pylons 312 located on the first side of the aircraft 300 and a second set of pylons 314 in the illustrated embodiment. The first set of pylons 312 are coupled to the first portion 342 of the first wing 308 and the second wing 310, where each of the first wing 308 and the second wing 310 has a pylon from the first set of pylons 312 coupled to the first portion 342 of the first wing 308 and the second wing 310. The second set of pylons 314 are coupled to the second portion 344 of the first wing 308 and the second wing 310, where each of the first wing 308 and the second wing 310 has a pylon from the second set of pylons 314 coupled to the second portion 344 of the first wing 308 and the second wing 310. In other embodiments, only a portion of the wings may have a pylon coupled to the wing. Each of the pylons include a rotor system located at a front end of the pylon. In particular, a first set of rotor systems 316 are located at front ends of the first set of pylons 312 and a second set of rotor systems 318 are located at front ends of the second set of pylons 314.

The aircraft 300 further includes one or more tail booms. In the illustrated embodiment, the aircraft 300 includes a first tail boom 320, a second tail boom 322, a third tail boom 324, and a fourth tail boom 326. The first tail boom 320, the second tail boom 322, the third tail boom 324, and the fourth tail boom 326 are located at rear ends of corresponding one of the pylons in the illustrated embodiment. The wings couple the tail booms and the pylons to the fuselage 302. When the aircraft 300 is landed, the tail booms may support the aircraft 300 on a surface. Further, the aircraft 300 can be in a vertical lift orientation when the tail booms support the aircraft 300 on the surface. The tail booms may extend behind the fuselage 302 by a first distance 328, where the trailing edge 306 of the fuselage 302 is located between the tail booms and the front edge 304 of the fuselage 302. Further, an imaginary plane drawn through the tail booms may be located behind the trailing edge 306, where the imaginary plane defines a clearance area between a surface on which the aircraft 300 is supported when landed and the fuselage 302.

The aircraft 300 further includes a tail 330 coupled to the fuselage 302. The tail 330 comprises a foldable tail, where the tail 330 is rotatably coupled to the fuselage 302. The tail 330 may be coupled to the aft of the fuselage 302, such as being coupled at the trailing edge 306 of the fuselage 302. The tail 330 may be coupled to the fuselage 302 via a rotation element 332, where the tail 330 may rotate around the rotation element 332. In some embodiments, the rotation element 332 may comprise a hinge. The aircraft 300 further includes a tail actuator that can cause the tail 330 to rotate between an extended position and a retracted position. In some embodiments, the tail actuator may comprise a motor that causes the tail 330 to rotate. In the illustrated embodiment, the tail 330 is shown in the extended position, where the tail 330 extends away from the fuselage 302 when the tail 330 is in the extended position. The tail 330 extends away from the fuselage 302 by a second distance 334 in the extended position, where the second distance 334 is greater than the first distance 328. The tail 330 may provide stability in flight when the tail 330 is in the extended position and the aircraft 300 is in a forward thrust orientation.

The tail 330 may include an extension member 340 that extends from the fuselage 302. The tail 330 further includes one or more fins, where the fins are coupled to the extension member 340. In particular, the tail 330 includes a first fin 336 and a second fin 338 in the illustrated embodiment. The first fin 336 and the second fin 338 may form a V-shape, where the tail 330 may be referred to as a v-tail when the first fin 336 and the second fin 338 for the V-shape. In some embodiments, an angle between the first fin 336 and the second fin 338 approximately (i.e., within 5 degrees of) 45 degrees. In other embodiments, the first fin 336 and the second fin 338 may be rotationally coupled to the extension member 340, where the first fin 336 and the second fin 338 may rotate about the extension member 340. In some of these embodiments, the first fin 336 and the second fin 338 may be rotated with an angle between the first fin 336 and the second fin 338 being between 30 and 80 degrees as the fins rotate. In these embodiments, the aircraft 300 may include one or more fin actuators, where the fin actuators can cause the first fin 336 and the second fin 338 to rotate. In some of these embodiments, each fin actuator may comprise a motor.

Figure 4:
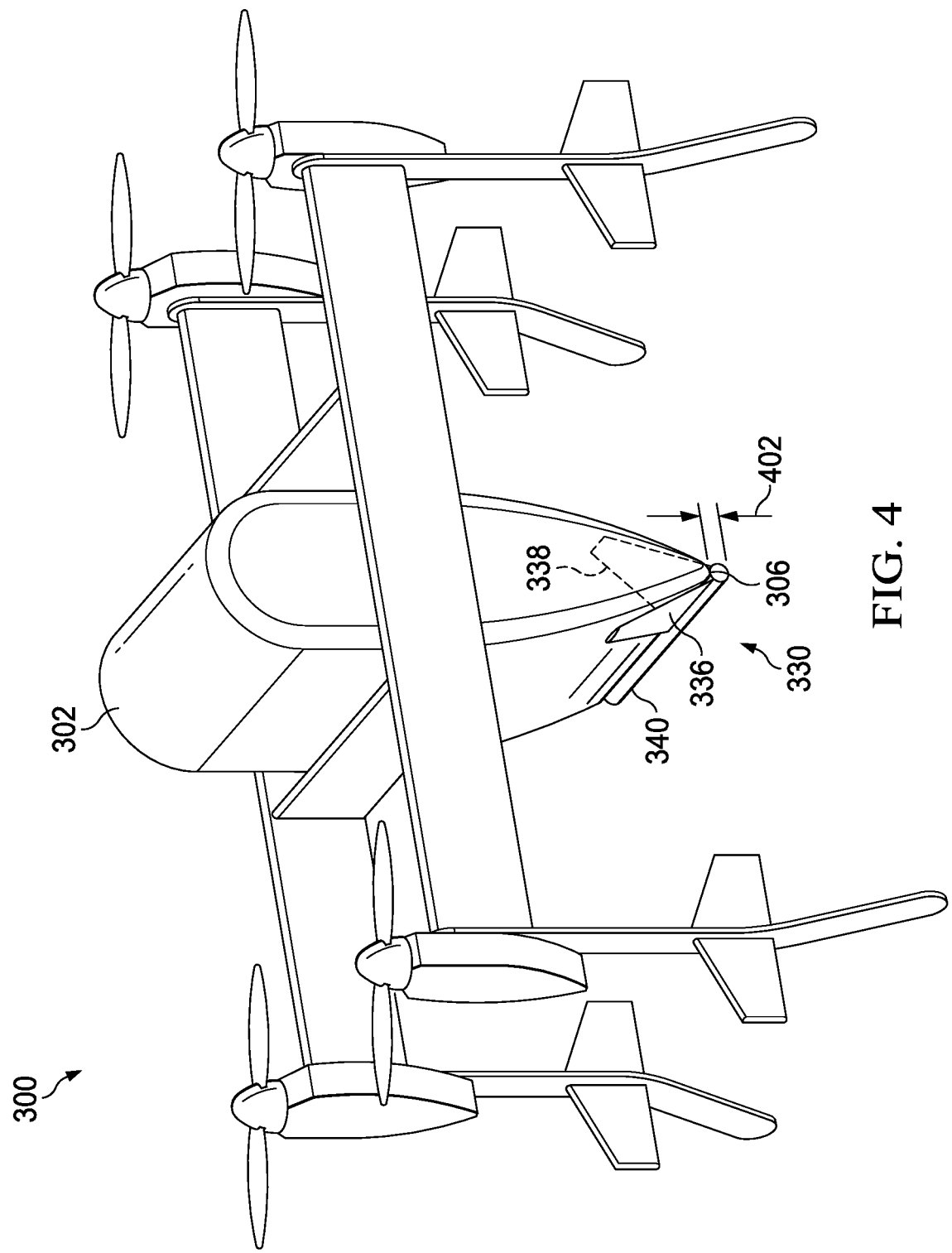
FIG. 4 is another oblique view of the aircraft of FIG. 3 in accordance with embodiments described herein.

FIG. 4 is another oblique view of the aircraft 300 of FIG. 3 in accordance with embodiments described herein. As illustrated, the aircraft 300 has the tail 330 in the retracted position. Further, the aircraft 300 is illustrated in the vertical lift orientation of the aircraft 300.

With the tail 330 in the retracted position, the tail 330 extends along the fuselage 302. In particular, the tail 330 may extend along the trailing edge 306 of the fuselage 302.

The extension member 340 may extend along the fuselage 302 with the first fin 336 located along a first side of the fuselage 302 and the second fin 338 located along a second side of the fuselage 302 when the tail 330 is in the retracted position. In embodiments where the first fin 336 and the second fin 338 are rotatable, a portion of the first fin 336 may be rotated against the first side of the fuselage 302 and a portion of the second fin 338 may be rotated against the second side of the fuselage 302. When in the tail 330 is in the retracted portion, a portion of the tail 330 furthest behind the fuselage 302 may be located a third distance 402 from the trailing edge 306 of the fuselage 302, where the third distance 402 is less than the first distance 328 (FIG. 3). Further, the tail 330 may be located within the clearance area behind the fuselage 302.

Having the tail 330 in the retracted position while the aircraft 300 is in the vertical lift orientation may reduce an amount of force that may be generated by sidewinds as compared to having the tail 330 in the extended position and may prevent the tail 330 from interfering with a surface when the aircraft 300 is landed on the surface. Further, the tail 330, including the first fin 336 and the second fin 338, may protect portions of the fuselage 302 from contact by objects extending from the surface. In some embodiments, the tail 330 may be transitioned between the extended position and the retracted position when the aircraft 300 is in the vertical lift orientation. In other embodiments, the tail 330 may be transitioned when the aircraft 300 is in either of the vertical lift orientation or the forward thrust orientation.

FIG. 5 is a side view of a portion of an aircraft 500 in accordance with embodiments described herein. In particular, the portion of the aircraft 500 shown includes a trailing edge 502 of a fuselage 504 and a tail 506 coupled to the fuselage 504. The aircraft 500 may include one or more of the features of the aircraft 300 (FIG. 3). Further, the features of the aircraft 500 may be implemented by the aircraft 300.

In the illustrated embodiment, the tail 506 is rotatably coupled to the trailing edge 502 of the fuselage 504 via a rotation element 508. In some embodiments, the rotation element 508 may comprise a hinge. The tail 506 may be rotated about the rotation element 508 between an extended position and a retracted position. The tail 506 is illustrated in the retracted position. In the retracted position, an extension member 510 of the tail 506 extends along the trailing edge 502 parallel to the trailing edge 502. In some embodiments, the extension member 510 may extend for an entire length of the trailing edge 502 and may protect the trailing edge 502 from damage when the tail 506 is in the retracted position. Further, fins 512 extend along the sides of the fuselage 504 when the tail 506 is in the retracted position. In particular, a first of the fins 512 is shown extending along a first side of the fuselage 504. A portion of the fuselage 504 may be located between the first of the fins 512 and a second of the fins with the tail 506 in the retracted position. In some embodiments, the fins 512 may contact the respective sides of the fuselage 504 when the tail 506 is in the retracted position. In other embodiments, the extension member 510 may be located against the trailing edge 502 of the fuselage 504 or may be at a non-parallel angle to the trailing edge 502 of the fuselage 504.

FIG. 6 is a cross-sectional, end view of the portion of the aircraft 500 of FIG. 5 in accordance with embodiments described herein. In particular, FIG. 6 illustrates the trailing edge 502 of the fuselage 504 with the tail 506 in the retracted position.

The extension member 510 is located parallel to the trailing edge 502 in the illustrated embodiment. The rotation element 508 (FIG. 5) may maintain a space between the extension member 510 and the trailing edge 502 of the fuselage 504. In the illustrated embodiment, a first fin 602 of the fins 512 and a second fin 604 of the fins 512 may form an angle 606, where the angle 606 is approximately (within 5 degrees) 45 degrees. In the illustrated embodiment, an angle 606 formed by the sidewalls of the fuselage 504 may be less than 45 degrees, thereby leaving space between the sidewalls of the fuselage 504 and the fins 512. Further, a portion of the fuselage 504 may be located between the first fin 602 and the second fin 604. The first fin 602 and the second fin 604 may shield the portion of the fuselage 504 from contact by external objects, thereby protecting the portion of the fuselage 504 from damage.

FIG. 7 is a cross-sectional, end view of a portion of another aircraft 700 in accordance with embodiments described herein. The aircraft 700 may include one or more of the features of the aircraft 300 (FIG. 3) and/or the aircraft 500 (FIG. 5).

The portion of the aircraft 700 includes a trailing edge 702 of a fuselage 704 with a tail 706 in a retracted position. In the illustrated embodiment, the aircraft 700 further includes an antenna 708 coupled to the fuselage 704. The tail 706 includes a first fin 710 that extends along a first side 712 of the fuselage 704 and a second fin 714 that extends along a second side 716 of the fuselage 704. The antenna 708 is located between the first fin 710 and the first side 712 when the tail 706 is in the retracted position. The first fin 710 may protect the antenna 708 from damage that may occur from objects that may contact the antenna 708 while the aircraft 700 is landing. In other embodiments, the aircraft 700 may have one or more antennas located between the first side 712 of the fuselage 704 and the first fin 710, between the second side 716 of the fuselage 704 and the second fin 714, or both.

Figure 8:
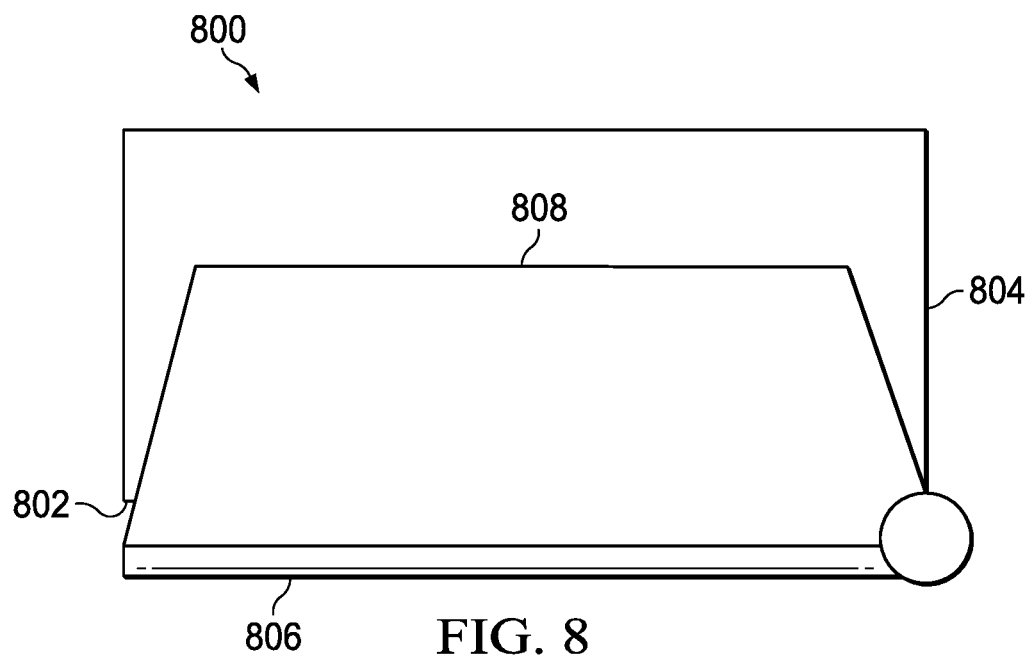
FIG. 8 is a side view of a portion of another aircraft in accordance with embodiments described herein.

FIG. 8 is a side view of a portion of another aircraft 800 in accordance with embodiments described herein. The aircraft 800 may include one or more of the features of the aircraft 300 (FIG. 3), the aircraft 500 (FIG. 5), and/or the aircraft 700 (FIG. 7).

The portion of the aircraft 800 includes a trailing edge 802 of a fuselage 804 with a tail 806 in a retracted position. In the illustrated embodiment, the tail 806 extends for an entirety of the length of the trailing edge 802. In particular, fins 808 of the tail 806 extend for the entirety of the length of the trailing edge 802. An entirety of the length of the trailing edge 802 may be located between the fins 808 in some embodiments. The fins 808 may protect the entirety of the trailing edge 802 from damage, and may protect a greater portion of the fuselage 804 as compared to shorter fins, that may occur due to objects that may contact the trailing edge 802 while the aircraft 800 is landing. In other embodiments, the fins 808 of the tail 806 may extend for a majority (i.e., greater than 50%) of the length of the trailing edge 802.

Figure 9:
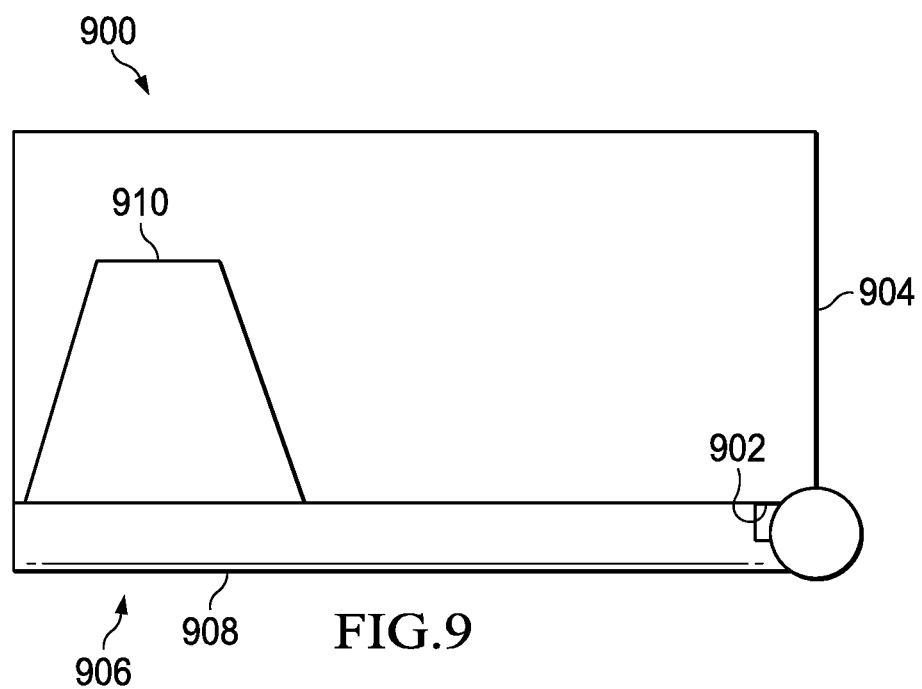
FIG. 9 is a side view of a portion of another aircraft in accordance with embodiments described herein.

FIG. 9 is a side view of a portion of another aircraft 900 in accordance with embodiments described herein. The aircraft 900 may include one or more of the features of the aircraft 300 (FIG. 3), the aircraft 500 (FIG. 5), the aircraft 700 (FIG. 7), and/or the aircraft 800 (FIG. 8).

The portion of the aircraft 900 includes a trailing edge 902 of a fuselage 904 with a tail 906 in a retracted position. The tail 906 includes an extension member 908 that extends along the trailing edge 902 of the fuselage 904. The extension member 908 is v-shaped in the illustrated embodiment, where the trailing edge 902 is located between a first side of the extension member 908 and a second side of the extension member 908, and the second side of the extension member 908 and the second side of the extension member 908 protect the trailing edge. The tail 906 further includes one or more fins 910 coupled to the extension member 908. The fins 910 may form a V-shape, where the v of the fins 910 is larger than the v of the extension member. A portion of the fuselage 904 is located between a first fin and a second fin of the tail 906.

Figure 10:
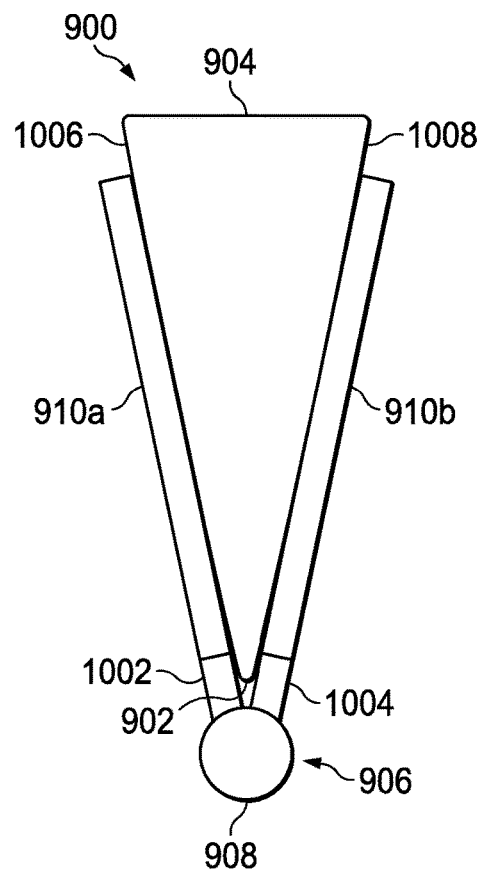
FIG. 10 is an end view of the portion of the aircraft of FIG. 9 in accordance with embodiments described herein.

FIG. 10 is an end view of the portion of the aircraft 900 of FIG. 9 in accordance with embodiments described herein. In particular, FIG. 10 illustrates the trailing edge 902 of the fuselage 904 with the tail 906 located in a retracted position and the view point being from an opposite end of the extension member 908 from the fins 910. When in the retracted position, the extension member 908 extends along the trailing edge 902 of the fuselage 904.

The extension member 908 has a first side 1002 and a second side 1004. The first side 1002 of the extension member 908 extends along a first side 1006 of the fuselage 904 and the second side 1004 of the extension member 908 extends along a second side 1008 of the fuselage 904. The tail 906 further includes a first fin 910a that extends along the first side 1006 of the fuselage 904 and a second fin 910b that extends along the second side 1008 of the fuselage 904. The first fin 910a and the second fin 910b extend from the extension member 908 to extend further along the first side 1006 and the second side 1008, respectively, of the fuselage 904 than the sides of the extension member 908.

Figure 11:
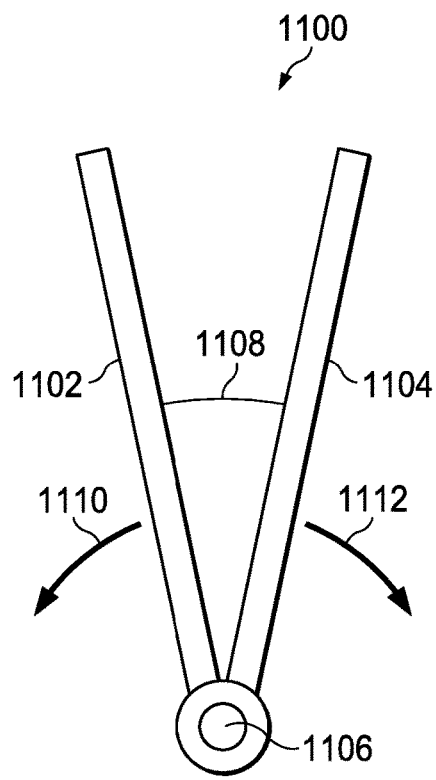
FIG. 11 is an end view of a portion of a tail in accordance with embodiments described herein.

FIG. 11 is an end view of a portion of a tail 1100 in accordance with embodiments described herein. The tail 1100 may include one or more of the features of the tail 330 (FIG. 3), the tail 506 (FIG. 5), the tail 706 (FIG. 7), and/or the tail 806 (FIG. 8). Further, one or more features of the tail 1100 may be implemented by the tail 330, the tail 506, the tail 706, and/or the tail 806 in some embodiments.

The portion of the tail 1100 illustrated includes a first fin 1102, a second fin 1104, and a rotation element 1106, where the rotation element 1106 rotatably couple the first fin 1102 and the second fin 1104 to an extension member (such as the extension member 340 (FIG. 3) and/or the extension member 510 (FIG. 5)) of the tail 1100. The first fin 1102 and the second fin 1104 may be rotated about the rotation element 1106 via one or more actuators (which may be referred to as "fin actuators"). In some embodiments, the actuators may comprise one or more motors. In the illustrated embodiment, the first fin 1102 and the second fin 1104 may be in a narrow position of the first fin 1102 and the second fin 1104. The first fin 1102 and the second fin 1104 may form an angle 1108 when in the narrow position, where the angle 1108 may be a smallest angle that may be formed by the first fin 1102 and the second fin 1104. In some embodiments the angle 1108 may be 30 degrees. The first fin 1102 and the second fin 1104 may be rotated away from each other about the rotation element 1106 (as indicated by arrow 1110 and arrow 1112) by the fin actuators.

Figure 12:
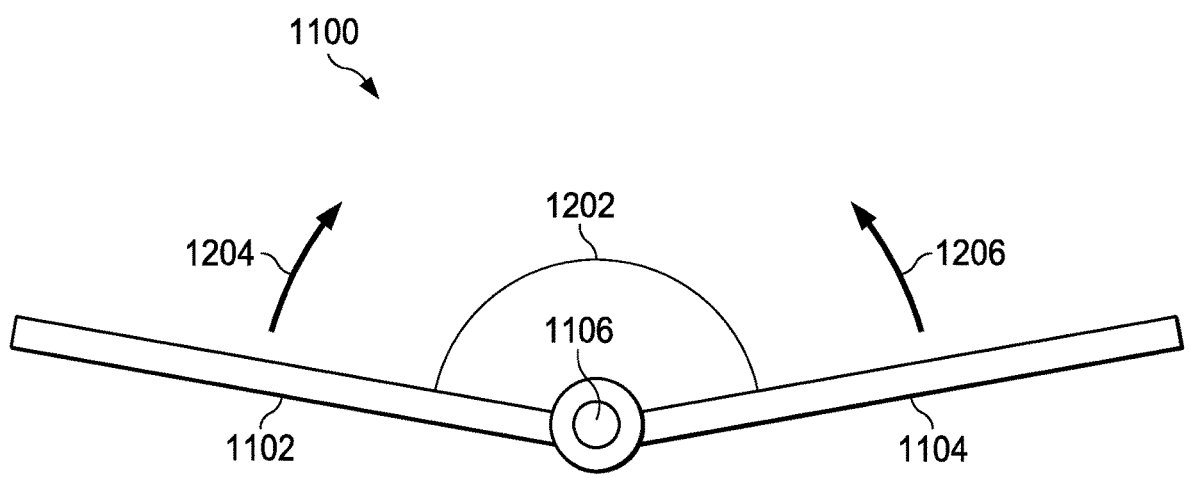
FIG. 12 is an end view of the portion of the tail of FIG. 11 in accordance with embodiments described herein.

FIG. 12 is an end view of the portion of the tail 1100 of FIG. 11 in accordance with embodiments described herein. In particular, FIG. 12 illustrates the first fin 1102 and the second fin in a wide position of the first fin 1102 and the second fin 1104. The first fin 1102 and the second fin 1104 may form an angle 1202 when in the wide position, where the angle 1202 may be a largest angle that may be formed by the first fin 1102 and the second fin 1104. In some embodiments the angle 1202 may be 80 degrees. The first fin 1102 and the second fin 1104 may be rotated toward each other about the rotation element 1106 (as indicated by arrow 1204 and arrow 1206) by the fin actuators. The fin actuators may rotate the first fin 1102 and the second fin 1104 between the wide position and the narrow position, where both the first fin 1102 and the second fin 1104 may be maintained in respective positions between the wide position and the narrow position.

Figure 13:
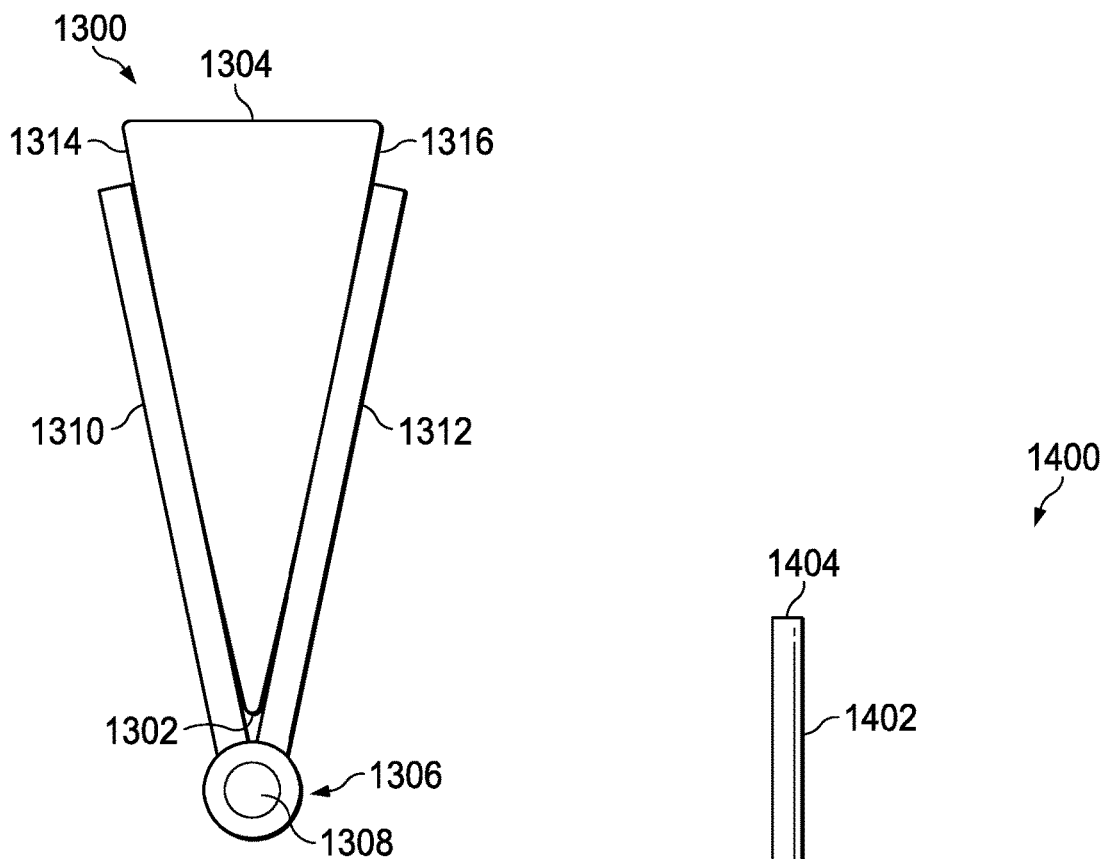
FIG. 13 is a cross-sectional, end view of a portion of another aircraft in accordance with embodiments described herein.

FIG. 13 is a cross-sectional, end view of a portion of another aircraft 1300 in accordance with embodiments described herein. The aircraft 1300 may include one or more of the features of the aircraft 300 (FIG. 3) and/or the aircraft 500 (FIG. 5). Further, the aircraft 300 and/or the aircraft 500 may implement one or more of the features of the aircraft 1300 in some embodiments.

The portion of the aircraft 1300 illustrated includes a trailing edge 1302 of the fuselage 1304 with a tail 1306 in a retracted position. The tail 1306 includes a rotation element 1308, where the rotation element 1308 rotationally couples a first fin 1310 and a second fin 1312 to an extension member (such as the extension member 340 (FIG. 3)). The rotation element 1308 allows the first fin 1310 and the second fin 1312 to rotate about the extension member. In the illustrated embodiment, the first fin 1310 and the second fin 1312 are rotated against the fuselage 1304 when the tail 1306 is in the retracted position. In particular, the first fin 1310 is rotated against a first side 1314 of the fuselage 1304 and the second fin 1312 is rotated against a second side 1316 of the fuselage 1304 when the tail 1306 is in the retracted position.

Figure 14:
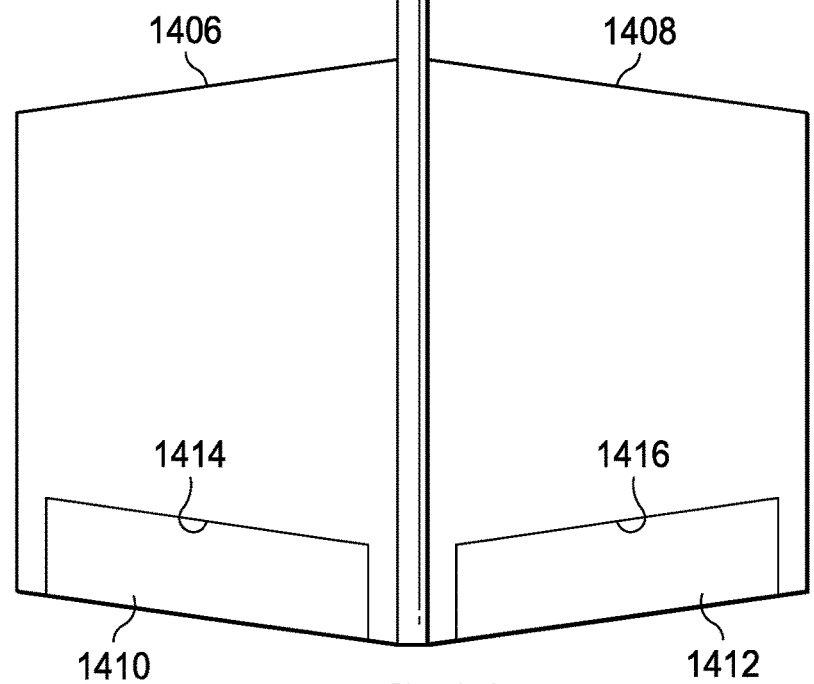
FIG. 14 is a top view of a tail in accordance with embodiments described herein.

FIG. 14 is a top view of a tail 1400 in accordance with embodiments described herein. The tail 1400 may include one or more of the features of the tail 330 (FIG. 3), the tail 506 (FIG. 5), the tail 706 (FIG. 7), the tail 806 (FIG. 8), and/or the tail 1306 (FIG. 13). Further, the tail 330, the tail 506, the tail 706, the tail 806, and/or the tail 1306 may implement one or more of the features of the tail 1400 in some embodiments.

The tail 1400 includes an extension member 1402. The extension member 1402 can be rotationally coupled to a fuselage at a first end 1404 of the extension member 1402.

The tail 1400 further includes a first fin 1406 and a second fin 1408. The first fin 1406 and the second fin 1408 may be fixedly coupled or rotationally coupled in embodiments. For example, the first fin 1406 and the second fin 1408 are fixedly coupled in a V-shape to the extension member 1402 (such as the first fin 336 (FIG. 3) and the second fin 338 (FIG. 3) are coupled to the extension member 340 (FIG. 3)) in some embodiments. In other embodiments, the first fin 1406 and the second fin 1408 are rotationally coupled to the extension member 1402 (such as the first fin 1102 (FIG. 11) and the second fin 1104 (FIG. 11) are rotationally coupled via the rotation element 1106 (FIG. 11)).

The first fin 1406 includes a first elevator 1410 and the second fin 1408 includes a second elevator 1412. The first elevator 1410 may rotate up and down about a front edge 1414 of the first elevator 1410. Further, the second elevator 1412 may rotate up and down about a front edge 1416 of the second elevator 1412. One or more elevator actuators may cause the first elevator 1410 and the second elevator 1412 to be rotated. As the first elevator 1410 and the second elevator 1412, the first elevator 1410 and the second elevator 1412 may provide elevator functions and rudder functions for an aircraft having the tail 1400. For example, the first elevator 1410 and the second elevator 1412 may affect a pitch and/or a yaw of the aircraft as the first elevator 1410 and the second elevator 1412 are rotated.

In other embodiments, the first elevator 1410 and the second elevator 1412 may be omitted from the first fin 1406 and the second fin 1408, respectively. In some of these embodiments, one or more elevators and/or rudders may be implemented on the tail booms (such as tail booms 106

(FIG. 1)) and/or the horizontal stabilizers (such as the horizontal stabilizers 108 (FIG. 1)). In some embodiments, one or more elevators and/or rudders may be implemented on the tail booms, the horizontal stabilizers, the fins (such as the first fin 1406 and the second fin 1408), or some combination thereof.

Figure 15:
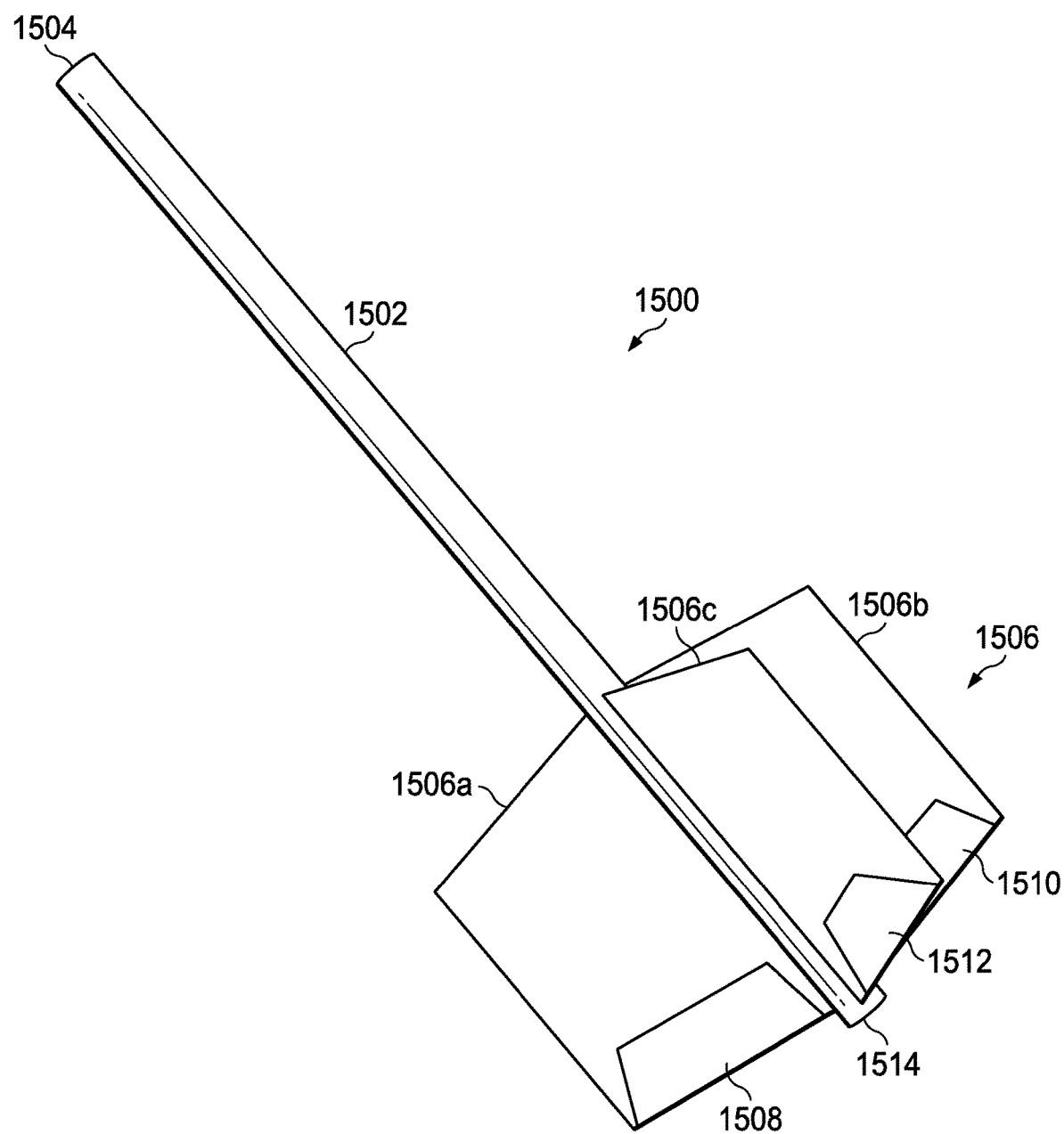
FIG. 15 is a perspective view of a tail in accordance with embodiments described herein.

FIG. 15 is a perspective view of a tail 1500 in accordance with embodiments described herein. The tail 1500 may include one or more of the features of the tails described throughout the disclosure, including the tail 122 (FIG. 2), the tail 330 (FIG. 3), the tail 506 (FIG. 5), the tail 706 (FIG. 7), the tail 806 (FIG. 8), the tail 1100 (FIG. 11), the tail 1306 (FIG. 13), and/or the tail 1400 (FIG. 14).

The tail 1500 includes an extension member 1502. The extension member 1502 may rotatably couple to an aft of a fuselage (such as the fuselage 102 (FIG. 1), the fuselage 302 (FIG. 3), the fuselage 504 (FIG. 5), the fuselage 704 (FIG. 7), the fuselage 804 (FIG. 8), and/or the fuselage 1304 (FIG. 13)) at a first end 1504 of the extension member 1502. In particular, the extension member 1502 may be coupled to the fuselage via a rotation element, such as the rotation element 332 (FIG. 3) and/or the rotation element 508 (FIG. 5).

The tail 1500 further includes one or more fins 1506 coupled to the extension member 1502. The fins 1506 may be rotatably coupled to the extension member 1502 and may be located toward a second end 1514 of the extension member 1502. In the illustrated embodiment, the tail 1500 includes a first fin 1506a, a second fin 1506b, and a third fin 1506c. The first fin 1506a and the second fin 1506b may extend from the extension member 1502 in opposite directions and comprise horizontal stabilizers of the tail 1500. The third fin 1506c may extend from the extension member 1502 in a direction that is perpendicular to both the first fin 1506a and the second fin 1506b, where the third fin 1506c comprises a vertical stabilizer of the tail 1500. In embodiments, where the fins 1506 are rotatably coupled to the extension member 1502, the fins 1506 may be rotated about the extension member 1502 to different positions and the angles between the fins 1506 may change as the fins 1506 are rotated.

The first fin 1506a may include an elevator 1508 and the second fin 1506b may include an elevator 1510. The elevator 1508 is located at an aft of the first fin 1506a and the elevator 1510 is located at an aft of the second fin 1506b. Each of the elevator 1508 and the elevator 1510 may rotate up and down to affect a pitch of an aircraft that implements the tail 1500. The third fin 1506c may include a rudder 1512. One or more elevator actuators may cause the elevator 1508 and the elevator 1510 to rotate up and down. The rudder 1512 is located at an aft of the third fin 1506c. The rudder 1512 may rotate side-to-side to affect a yaw of the aircraft that implements the tail 1500. A rudder actuator may cause the rudder 1512 to rotate side-to-side.

In some embodiments, the elevator 1508, the elevator 1510, and/or the rudder 1512 may be omitted from the first fin 1506a, the second fin 1506b, and the third fin 1506c, respectively. In some of these embodiments, one or more elevators and/or rudders may be implemented on the tail booms (such as tail booms 106 (FIG. 1)) and/or the horizontal stabilizers (such as the horizontal stabilizers 108 (FIG. 1)). In some embodiments, one or more elevators and/or rudders may be implemented on the tail booms, the horizontal stabilizers, the fins (such as the first fin 1406 and the second fin 1408), or some combination thereof.

Figure 16:
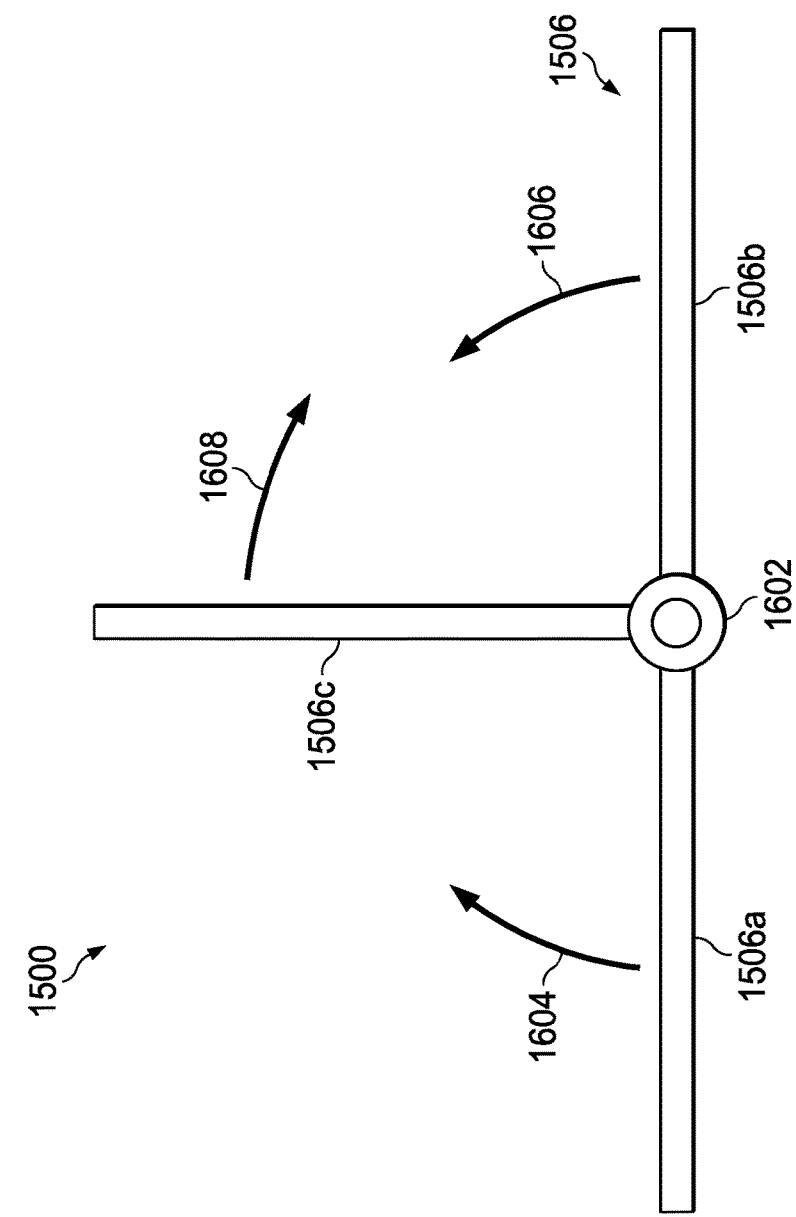
FIG. 16 is an end view of the tail of FIG. 15 in accordance with embodiments described herein.

FIG. 16 is an end view of the tail 1500 of FIG. 15 in accordance with embodiments described herein. In particular, FIG. 16 illustrates the fins 1506 located in a flight orientation, where the tail 1500 is in an extended position.

The first fin 1506a, the second fin 1506b, and the third fin 1506c may be coupled to the extension member 1502 (FIG. 15) via one or more rotation elements 1602. The rotation elements 1602 may allow the first fin 1506a, the second fin 1506b, and third fin 1506c. In the illustrated instance, the first fin 1506a and the second fin 1506b extend from the extension member 1502 in opposite directions. The third fin 1506c extends from the extension member in a third direction that is perpendicular to the directions that the first fin 1506a and the second fin 1506b extend from the extension member 1502. The first fin 1506a and the second fin 1506b may be rotated toward the third fin 1506c, as illustrated by first arrow 1604 and second arrow 1606 respectively. Further, the third fin 1506c may be rotated toward one of the first fin 1506a and the second fin 1506b. In the illustrated embodiment, the third fin 1506c may be rotated toward the second fin 1506b, as illustrated by the third arrow 1608. In other embodiments, the third fin 1506c may be rotated toward the first fin 1506a.

Figure 17:
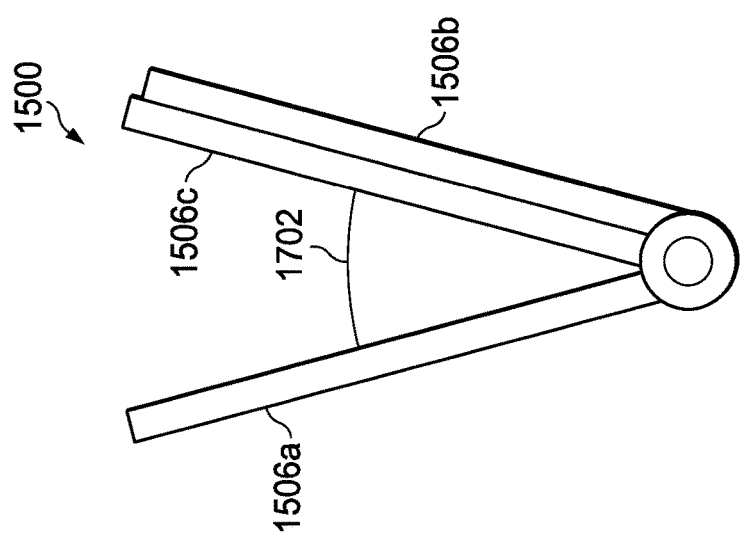
FIG. 17 is another end view of the tail of FIG. 15 in accordance with embodiments described herein.

FIG. 17 is another end view of the tail 1500 of FIG. 15 in accordance with embodiments described herein. In particular, FIG. 16 illustrates the fins 1506 located in a retracted orientation.

In the illustrated instance, the first fin 1506a has been rotated about the extension member 1502 (FIG. 15) toward the third fin 1506c as compared to the illustrated instance in FIG. 16. Further, the second fin 1506b and the third fin 1506c have been rotated about the extension member 1502 toward each other as compared to the illustrated instance in FIG. 16. The second fin 1506b and the third fin 1506c may abut each other as illustrated. In other instances, the second fin 1506b and the third fin 1506c may form a small angle between the second fin 1506b and the third fin 1506c in the retracted orientation, where the small angle may be less than 10 degrees.

While in the retracted orientation, an angle 1702 may be formed between the first fin 1506a and the third fin 1506c. The angle 1702 between the first fin 1506a and the third fin 1506c may be substantially (within 5 degrees) equal to an angle formed by the sides of a fuselage implementing the tail 1500 at a trailing edge of the fuselage. When in the retracted position, the first fin 1506a and the third fin 1506c may extend along the sides of the fuselage.

Figure 18:
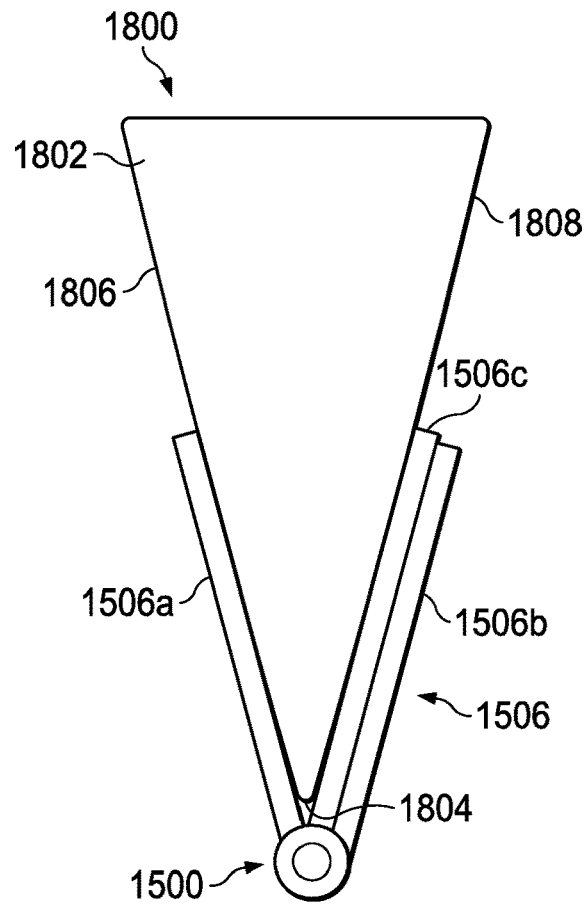
FIG. 18 is a cross-sectional, end view of a portion of an aircraft in accordance with embodiments described herein.

FIG. 18 is a cross-sectional, end view of a portion of an aircraft 1800 in accordance with embodiments described herein. In particular, FIG. 18 illustrates the tail 1500 of FIG. 15 implemented via the aircraft 1800.

The aircraft 1800 includes a fuselage 1802. The fuselage 1802 may include one or more of the features of the fuselages described throughout this disclosure, including the fuselage 102 (FIG. 1), the fuselage 302 (FIG. 3), the fuselage 504 (FIG. 5), the fuselage 704 (FIG. 7), the fuselage 804 (FIG. 8), and/or the fuselage 1304 (FIG. 13). A trailing edge 1804 of the fuselage 1802 is illustrated in FIG. 18.

The tail 1500 is located in a retracted position in the illustrated instance. While in the retracted position, the extension member 1502 (FIG. 15) may extend substantially (within 5 degrees) parallel to the trailing edge 1804 of the fuselage 1802. The fins 1506 are illustrated in the retracted orientation. The first fin 1506a abuts a first side 1806 of the fuselage 1802 and the third fin 1506c abuts a second side 1808 of the fuselage 1802. A portion of the fuselage 1802, including a portion of the trailing edge 1804, is located between the first fin 1506a and the third fin 1506c, where the first fin 1506a and the third fin 1506c may protection the portion of the fuselage 1802 from damage. The second fin 1506b extends along the third fin 1506c, where the third fin 1506c may be located between the fuselage 1802 and the second fin 1506b.

Figure 19:
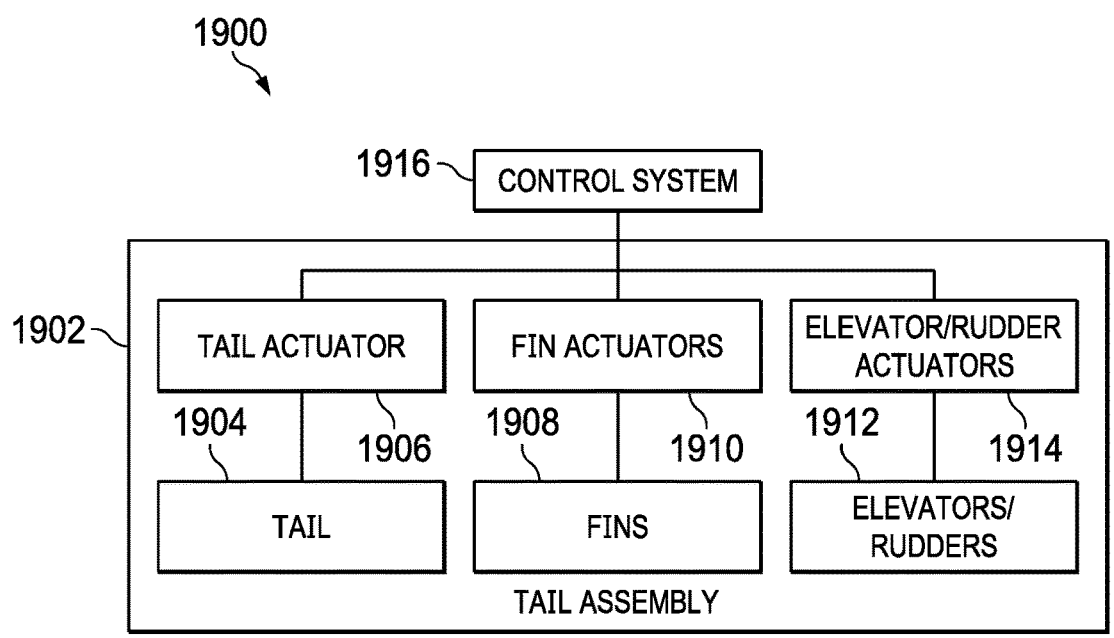
FIG. 19 is a block diagram of a foldable tail system in accordance with embodiments described herein.

FIG. 19 is a block diagram of a foldable tail system 1900 in accordance with embodiments described herein. The foldable tail system 1900 may be implemented by an aircraft, such as the aircraft 300 (FIG. 3), the aircraft 500 (FIG. 5), the aircraft 700 (FIG. 7), the aircraft 800 (FIG. 8), and/or the aircraft 1300 (FIG. 13). Further, the foldable tail system 1900, or some portion thereof, may be implemented a general-purpose processor system (such as the general-purpose processor system 2100 (FIG. 21)).

The foldable tail system 1900 includes a tail assembly 1902. The tail assembly 1902 includes a tail 1904. The tail 1904 may include one or more of the features of the tails described herein, including the tail 330 (FIG. 3), the tail 506 (FIG. 5), the tail 706 (FIG. 7), the tail 806 (FIG. 8), the tail 1100 (FIG. 11), the tail 1306 (FIG. 13), and/or the tail 1400 (FIG. 14). The tail 1904 comprises a foldable tail coupled to a fuselage of an aircraft via a rotation element. The tail assembly 1902 further includes a tail actuator 1906 coupled to the tail 1904. The tail actuator 1906 may cause the tail 1904 to be rotated about the rotation element. In some embodiments, the tail actuator 1906 may comprise a motor coupled to the tail 1904 that causes the tail 1904 to rotate about the rotation element.

The tail assembly 1902 further includes one or more fins 1908. The fins 1908 may include one or more of the features of the fins described throughout this disclosure, including the first fin 336 (FIG. 3), the second fin 338 (FIG. 3), the fins 512 (FIG. 5), the first fin 602 (FIG. 6), the second fin 604 (FIG. 6), the first fin 710 (FIG. 7), the second fin 714 (FIG. 7), the fins 808 (FIG. 8), the first fin 1102 (FIG. 11), the second fin 1104 (FIG. 11), the first fin 1310 (FIG. 13), the second fin 1312 (FIG. 13), the first fin 1406 (FIG. 14), and/or the second fin 1408 (FIG. 14). The fins 1908 may be rotationally coupled or fixedly coupled to an extension member of the tail 1904. In particular, the fins 1908 may be rotationally coupled to the extension member via a rotation element in some embodiments. In these embodiments, the tail assembly 1902 may further one or more fin actuators 1910 coupled to the fins 1908. The fin actuators 1910 may cause the fins 1908 to rotate when the fin actuators 1910 are actuated. In some of these embodiments, the fin actuators 1910 may comprise one or more motors that cause the fins to rotate about the extension member when actuated. In other embodiments, the fins 1908 may be fixedly coupled to the extension member and the fin actuators 1910 may be omitted.

The tail assembly 1902 may further include one or more elevators/rudders 1912. In particular, the elevators/rudders 1912 may include one or more elevators, one or more rudders, or some combination thereof. The elevators/rudders 1912 may include one or more of the features of the elevators and/or rudders described throughout this disclosure, including the first elevator 1410 (FIG. 14), the second elevator 1412 (FIG. 14), the elevator 1508 (FIG. 15), the elevator 1510 (FIG. 15), and/or the rudder 1512 (FIG. 15). The tail assembly 1902 may further include one or more elevator/rudder actuators 1914 coupled to the elevators/rudders 1912. The elevator/rudder actuators 1914 may cause the elevators/rudders 1912 to rotate when the elevator/rudder actuators 1914 are actuated. For example, the elevator/rudder actuators 1914 may cause the elevators/rudders 1912 to rotate up and down about a front edge of the elevators/rudders 1912 when the elevator/rudder actuators 1914 are actuated. In some embodiments, the elevator/rudder actuators 1914 may comprise one or more motors that cause the elevators/rudders 1912 to be rotated as the motors are actuated. In some embodiments, the elevators/rudders 1912 and/or the elevator/rudder actuators 1914 may be omitted entirely or may be omitted from the tail assembly 1902.

The foldable tail system 1900 further includes a control system 1916 coupled to the tail assembly 1902. In particular, the control system 1916 may be coupled to the tail actuator 1906, the fin actuators 1910, the elevator/rudder actuators 1914, or some combination thereof. The control system 1916 may transmit signals to the tail actuator 1906, the fin actuators 1910, and/or the elevator/rudder actuators 1914 to control actuation of the tail actuator 1906, the fin actuators 1910, and/or the elevator/rudder actuators 1914. The control system 1916 may receive commands from a pilot (either an onboard pilot or an offboard pilot) and utilize the commands to generate the signals to be transmitted to the tail actuator 1906, the fin actuators 1910, and/or the elevator/rudder actuators 1914. In some embodiments, the control system 1916 may be included in, or implemented by, a general-purpose processor system 2100.

Figure 20:
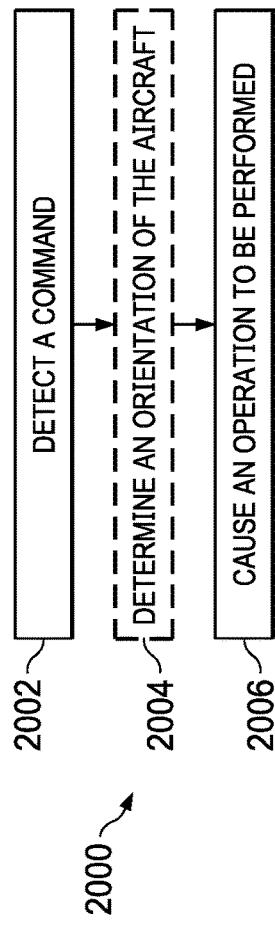
FIG. 20 is a flow chart of a procedure for tail assembly operation in accordance with embodiments described herein.

FIG. 20 is a flow chart of a procedure 2000 for tail assembly operation in accordance with embodiments described herein. For example, the control system 1916 (FIG. 19) may perform the procedure 2000 to control operation of the tail assembly 1902.

In stage 2002, a command to perform an operation with the tail assembly 1902 may be detected. The command may include an indication to transition a position of a tail of an aircraft, an indication to transition a position of one or more fins of the aircraft, an indication to transition a position of one or more elevators of the aircraft, an indication to transition a position of one or more rudders of the aircraft, or some combination thereof. The procedure 2000 may proceed from stage 2002 to stage 2004. In embodiments where stage 2004 is omitted, the procedure 2000 may proceed from stage 2002 to stage 2006.

In stage 2004, an orientation of the aircraft may be determined. In particular, whether the aircraft is in a forward thrust orientation or a vertical lift orientation. In some embodiments, stage 2004 may be performed only when certain commands have been detected, such as when the command comprises an indication to transition a position of the tail. Based on the orientation, the procedure 2000 may be halted without the command in some instances. For example, if the aircraft is determined to be in the forward thrust orientation and the command comprises an indication to transition a position of the tail, the procedure 2000 may be halted, thereby limiting the transition of the position of the tail to when the aircraft is in the vertical lift orientation. The procedure 2000 may proceed from stage 2004 to stage 2006. In other embodiments, stage 2004 may be omitted.

In stage 2006, an operation corresponding to the detected command may be performed. For example, a signal may be generated in response to detecting the command, where the signal corresponds to the operation. The signal may be provided to one or more of a tail actuator of the aircraft, fin actuators of the aircraft, elevator actuators of the aircraft, rudder actuators of the aircraft, or some combination thereof. In response to receiving the signal, the tail actuator, the fin actuators, the elevator actuators, and/or the rudder actuators may be actuated and may cause the tail, the fins, and/or the elevators to be rotated in accordance with the command.

Figure 21:
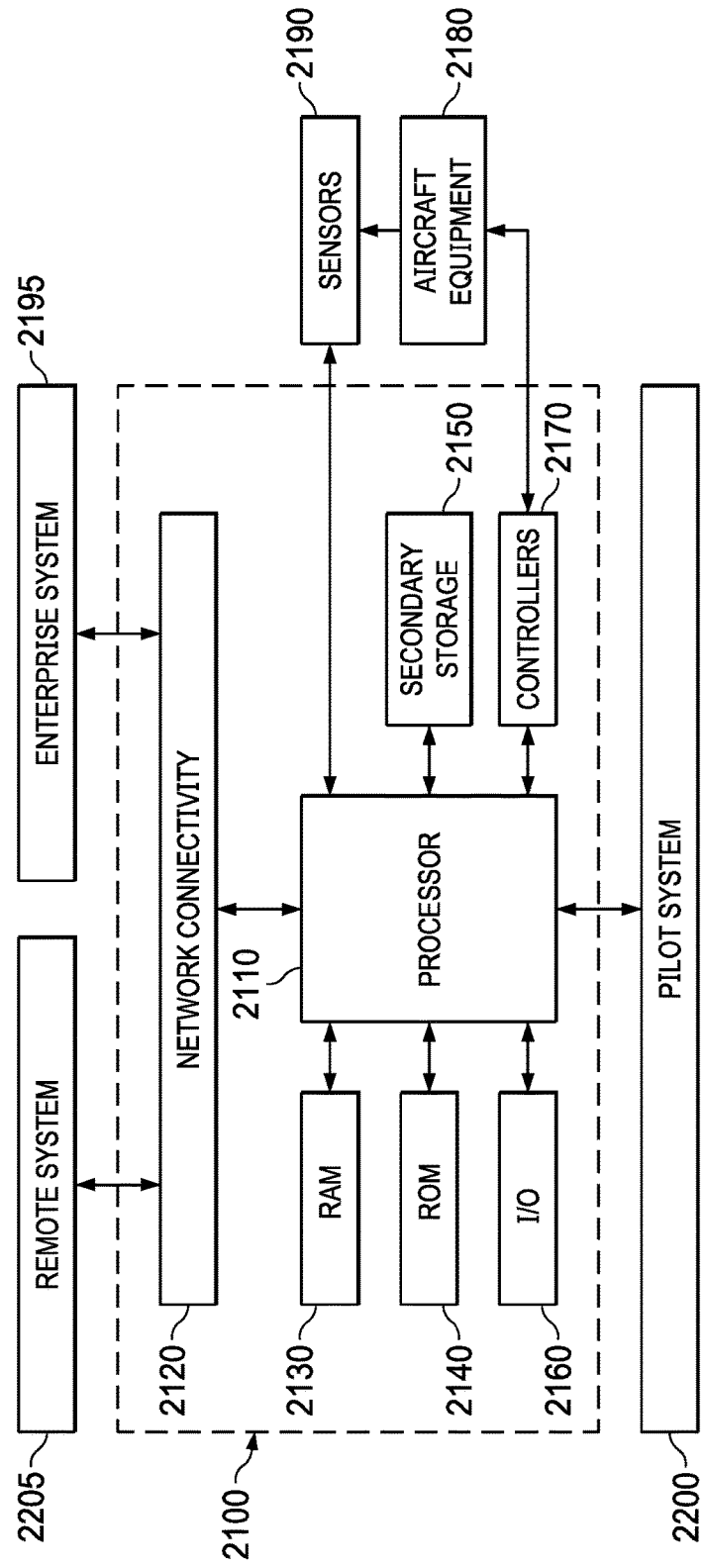
FIG. 21 is a schematic diagram of a general-purpose processor (e.g. electronic controller or computer) system suitable for implementing the embodiments of this disclosure.

Referring to FIG. 21, a schematic diagram of a general-purpose processor (e.g. electronic controller or computer) system 2100 suitable for implementing the embodiments of this disclosure is shown. System 2100 includes a processing component 2110 suitable for implementing one or more embodiments disclosed herein. In particular, control system 120 of aircraft 100 configured to control operation of the propulsion assemblies 115, tail assembly 1902 (FIG. 19), and/or other electronic systems of aircraft 100 disclosed herein may comprise one or more systems 2100. In addition to the processor 2110 (which may be referred to as a central processor unit or CPU), the system 2100 may include network connectivity devices 2120, random-access memory ("RAM") 2130, read only memory ("ROM") 2140, secondary storage 2150, and input/output (I/O) devices 2160. System 2100 may also comprise aircraft component controllers 2170 for generating control signals to aircraft equipment 2180 (e.g., propulsion assemblies 115 and/or control assemblies including control surfaces) in accordance with the teachings of embodiments described herein. Sensors 2190 (e.g., sensors 116, 118, 119) are also provided and provide sensor data to be processed by processor 2110. In some cases, some of these components may not be present or may be combined in various combinations with one another or with other components not shown. These components might be located in a single physical entity or in more than one physical entity. Any actions described herein as being taken by the processor 2110 might be taken by the processor 2110 alone or by the processor 2110 in conjunction with one or more components shown or not shown in the system 2100. It will be appreciated that the data and lookup tables described herein may be stored in memory (e.g., RAM 2130, ROM 2140) and/or in one or more databases comprising secondary storage 2150.

The processor 2110 executes instructions, codes, computer programs, or scripts that it might access from the network connectivity devices 2120, RAM 2130, ROM 2140, or secondary storage 2150 (which might include various disk-based systems such as hard disk, floppy disk, optical disk, or other drive). While only one processor 2110 is shown, multiple processors may be present. Thus, while instructions may be discussed as being executed by processor 2110, the instructions may be executed simultaneously, serially, or otherwise by one or multiple processors 2110. The processor 2110 may be implemented as one or more CPU chips and/or application specific integrated chips (ASICs).

The network connectivity devices 2120 may take the form of modems, modem banks, Ethernet devices, universal serial bus ("USB") interface devices, serial interfaces, token ring devices, fiber distributed data interface ("FDDI") devices, wireless local area network ("WLAN") devices, radio transceiver devices such as code division multiple access ("CDMA") devices, global system for mobile communications ("GSM") radio transceiver devices, worldwide interoperability for microwave access ("WiMAX") devices, and/or other well-known devices for connecting to networks. These network connectivity devices 2120 may enable the processor 2110 to communicate with the Internet or one or more telecommunications networks or other networks from which the processor 2110 might receive information or to which the processor 2110 might output information.

The network connectivity devices 2120 might also include one or more transceiver components capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component might include separate receiving and transmitting units or a single transceiver. Information transmitted or received by the transceiver may include data that has been processed by the processor 2110 or instructions that are to be executed by processor 2110. Such information may be received from and outputted to a network in the form, for example, of a computer data baseband signal or signal embodied in a carrier wave. The data may be ordered according to different sequences as may be desirable for either processing or generating the data, transmitting or receiving the data, and/or controlling the aircraft 100 and/or tail assembly 1902. The baseband signal, the signal embedded in the carrier wave, or other types of signals currently used or hereafter developed may be referred to as the transmission medium and may be generated according to several methods well known to one skilled in the art. In one embodiment, network connectivity devices 2120 may be used to communicate with an enterprise system 2195.

In a particular embodiment, enterprise system 2195 may include one or more databases for storing data communicated to the enterprise system, as well as modules for accessing and/or processing the data and I/O devices for interacting with and/or displaying the pre- or post-processed data. Such data may include an ID number, weight, CG, and inertia information associated with a payload. The data may also identify a type of the aircraft and control gain data determined for the combination of aircraft and payload. This information may be leveraged later for later aircraft/payload combination so that the information can be provided. Enterprise system 2195 may also receive sensor data from sensors 2190, which may be stored in one or more databases comprising enterprise system.

The RAM 2130 might be used to store volatile data and perhaps to store instructions that are executed by the processor 2110. The ROM 2140 is a non-volatile memory device that typically has a smaller memory capacity than the memory capacity of the secondary storage 2150. ROM 2140 might be used to store instructions and perhaps data that are read during execution of the instructions. Access to both RAM 2130 and ROM 2140 is typically faster than to secondary storage 2150. The secondary storage 2150 is typically comprised of one or more disk drives, tape drives, or solid-state drives and might be used for non-volatile storage of data or as an over-flow data storage device if RAM 2130 is not large enough to hold all working data. Secondary storage 2150 may be used to store programs or instructions that are loaded into RAM 2130 when such programs are selected for execution or information is needed.

The I/O devices 2160 may include liquid crystal displays (LCDs), touchscreen displays, keyboards, keypads, switches, dials, mice, track balls, voice recognizers, card readers, paper tape readers, printers, video monitors, transducers, sensors 2190 (e.g., sensors 116, 118, 119 of aircraft 100), motor drive electronics, or other well-known input or output devices, such a cyclic control, collective control, and pedal inputs used by a pilot, co-pilot, or remote pilot. Some or all of the I/O devices 2160 may be substantially similar to various components disclosed herein and/or may be components of any of the control systems (e.g., control system 120 of aircraft 100) and/or other electronic systems disclosed herein. Further, inputs provided through an I/O device 2160, such as control system 120, may communicate with aircraft component control 2170, which may include control for the tail assembly 1902. Thus, control system 120 may provide control signals to the tail assembly 1902 to adjust, control, and/or maintain positions of the tail of the aircraft 100, fins of the aircraft 100, elevators of the aircraft 100, and/or the aircraft 100 as a whole during flight. Feedback via aircraft equipment 2180 and/or sensors 2190 (e.g., sensors 116, 118, 119, and/or other aircraft system sensors) may further communicate through one or more of the network connectivity devices 2120 to provide feedback to control aircraft 100 and its associated systems.

It is to be understood by those skilled in the art that system 2100 may be implemented in a variety of forms including hardware, software, firmware, special purpose processors and combinations thereof, and may comprise an autonomous flight system. System 2100 may receive input from a variety of sources including onboard sources such as sensors 2190 and a pilot system 2200 as well as external sources such as a remote system 2205, global positioning system satellites or other location positioning systems and the like. For example, system 2100 may receive a flight plan including starting and ending locations for a mission from pilot system 2200 and/or remote system 2205. Thereafter system 2100 is operable to autonomously control all aspects of flight of an aircraft of the present disclosure.

For example, during the various operating modes of aircraft 100 including vertical takeoff and landing mode, hover flight mode, forward flight mode, and transitions therebetween, commands are provided to controllers 2170, which enable independent operation of each propulsion assembly 115 including, for example, controlling the rotational speed of the rotors, changing the pitch of the rotor blades, adjusting the thrust vectors and the like. In addition, these commands enable transition of aircraft 100 between the vertical lift orientation and the forward thrust orientation. Feedback may be received from controllers 2170 and each propulsion assembly 115. This feedback is processed by processor 2110 and can be used to supply correction data and other information to controllers 2170. Sensors 2190, such as positioning sensors, attitude sensors, speed sensors, environmental sensors, fuel sensors, temperature sensors, location sensors and the like, also provide information to further enhance autonomous control capabilities.

Some or all of the autonomous control capability of system 2100 can be augmented or supplanted by a remote flight control system, such as remote system 2205. Remote system 2205 may include one or computing systems that may be implemented on general-purpose computers, special purpose computers or other machines with memory and processing capability. For example, the computing systems may include one or more memory storage modules including, but is not limited to, internal storage memory such as random-access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 2205 may communicate with flight control system 2100 via network connectivity devices 2120 using include both wired and wireless connections.

Remote system 2205 preferably includes one or more flight data display devices configured to display information relating to one or more aircraft of the present disclosure. Display devices may be configured in any suitable form, including, for example, liquid crystal displays, light emitting diode displays, cathode ray tube displays or any suitable type of display. Remote system 2205 may also include audio output and input devices such as a microphone, speakers and/or an audio port allowing an operator to communicate with, for example, a pilot on board aircraft 100. The display device may also serve as a remote input device if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from pilot system 2200. Pilot system 2200 may be integrated with system 2100 or may be a standalone system preferably including a non-transitory computer readable storage medium including a set of computer instructions executable by a processor and may be implemented by a general-purpose computer, a special purpose computer or other machine with memory and processing capability. Pilot system 2200 may include one or more memory storage modules including, but is not limited to, internal storage memory such as random-access memory, non-volatile memory such as read only memory, removable memory such as magnetic storage memory, optical storage memory, solid-state storage memory or other suitable memory storage entity. Pilot system 2200 may be a microprocessor-based system operable to execute program code in the form of machine-executable instructions. In addition, pilot system 2200 may be connectable to other computer systems via a proprietary encrypted network, a public encrypted network, the Internet or other suitable communication network that may include both wired and wireless connections. Pilot system 2200 may communicate with system 2100 via a communication channel that preferably includes a wired connection.

Pilot system 2200 preferably includes a cockpit display device configured to display information to an onboard pilot. Cockpit display device may be configured in any suitable form, including, for example, as one or more display screens such as liquid crystal displays, light emitting diode displays and the like or any other suitable display type including, for example, a display panel, a dashboard display, an augmented reality display or the like. Pilot system 2200 may also include audio output and input devices such as a microphone, speakers and/or an audio port allowing an onboard pilot to communicate with, for example, air traffic control or an operator of a remote system. Cockpit display device may also serve as a pilot input device if a touch screen display implementation is used, however, other user interface devices may alternatively be used to allow an onboard pilot to provide control commands to an aircraft being operated responsive to onboard pilot control including, for example, a control panel, mechanical control devices or other control devices. As should be apparent to those having ordinarily skill in the art, through the use of system 2100, an aircraft of the present disclosure can be operated responsive to a flight control protocol including autonomous flight control, remote flight control or onboard pilot flight control and combinations thereof.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the disclosure and the claims are embodiment(s) of the present invention. Also, the phrases "at least one of A, B, and C" and "A and/or B and/or C" should each be interpreted to include only A, only B, only C, or any combination of A, B, and C.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. An aircraft, comprising:
   a fuselage having a trailing edge at an aft of the fuselage;
   a tail comprising:
      an extension member rotatably coupled to the fuselage, the extension member coupled at the trailing edge of the fuselage; and
      a first fin and a second fin rotatably coupled to the extension member;
   a tail actuator coupled to the fuselage and the tail, the tail actuator to transition the tail between an extended position and a retracted position, wherein, in the retracted position, the extension member of the tail extends along and parallel to the trailing edge of the fuselage; and
   a fin actuator to cause the first fin and the second fin to rotate about an axis extending longitudinally through the extension member to change an angle between the first fin and the second fin.

2. The aircraft of claim 1, wherein the tail comprises a v-tail.

3. The aircraft of claim 2, wherein the v-tail includes the first fin and the second fin that form a V-shape, and wherein a portion of the fuselage is located between the first fin and the second fin when the tail is in the retracted position.

4. The aircraft of claim 2, wherein the first fin and the second fin form a V-shape, and wherein, at one setting of the fin actuator, the angle between the first fin and the second fin is approximately 45 degrees.

5. The aircraft of claim 1, further comprising:
   wings coupled to the fuselage and extending away from the fuselage; and
   tail booms coupled to the fuselage via the wings, wherein the tail booms extend behind the fuselage by a first distance, and wherein the tail extends a second distance behind the fuselage when the tail is in the retracted position, the second distance being less than the first distance.

6. The aircraft of claim 5, wherein the tail extends a third distance behind the fuselage when the tail is in the extended position, the third distance being greater than the first distance.

7. The aircraft of claim 1, wherein the extension member of the tail extends for an entirety of a length of the trailing edge when the tail is in the retracted position.

8. The aircraft of claim 1, further comprising a control system coupled to the tail actuator, wherein the control system is to cause the tail actuator to transition the tail between the extended position and the retracted position.

9. The aircraft of claim 8, wherein the control system is to cause the tail actuator to transition the tail between the extended position and the retracted position when the aircraft is in a vertical lift orientation.

10. The aircraft of claim 1, wherein the first fin and the second fin form a V-shape.

11. The aircraft of claim 1, wherein the angle between the first fin and the second fin is to vary between 30 degrees and 80 degrees as the fin actuator causes the first fin and the second fin to rotate about the axis extending longitudinally through the extension member.

12. The aircraft of claim 1, wherein the fin actuator is to cause the first fin and the second fin to rotate against the fuselage when the tail is in the retracted position.

13. The aircraft of claim 1, further comprising an antenna extending from the fuselage, wherein the antenna is located between the fuselage and the tail when the tail is in the retracted position.

14. The aircraft of claim 1, wherein the aircraft comprises a vertical takeoff and landing vehicle ("VTOL").

15. The aircraft of claim 1, wherein, in the retracted position, the first fin and the second fin are on either side of the trailing edge of the fuselage.

* * * * *